(12) United States Patent
Goto

(10) Patent No.: US 9,978,143 B2
(45) Date of Patent: May 22, 2018

(54) CENTERLINE DETERMINING APPARATUS, MEDICAL APPARATUS, AND PROGRAM

(71) Applicant: General Electric Company, Schenectady, NY (US)

(72) Inventor: Takao Goto, Hino (JP)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days. days.

(21) Appl. No.: 15/384,600

(22) Filed: Dec. 20, 2016

(65) Prior Publication Data

US 2017/0186159 A1    Jun. 29, 2017

(30) Foreign Application Priority Data

Dec. 25, 2015   (JP) ................................ 2015/254535

(51) Int. Cl.
| | |
|---|---|
| G06K 9/00 | (2006.01) |
| G06T 7/00 | (2017.01) |
| G06T 7/73 | (2017.01) |
| G06K 9/52 | (2006.01) |
| G06K 9/62 | (2006.01) |
| G06T 7/68 | (2017.01) |
| G06K 9/46 | (2006.01) |

(52) U.S. Cl.
CPC .............. *G06T 7/0012* (2013.01); *G06K 9/52* (2013.01); *G06K 9/6267* (2013.01); *G06T 7/68* (2017.01); *G06T 7/73* (2017.01); *G06K 2009/4666* (2013.01); *G06K 2209/051* (2013.01); *G06T 2207/10088* (2013.01); *G06T 2207/30004* (2013.01); *G06T 2207/30101* (2013.01); *G06T 2207/30172* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 2010/0177945 | A1* | 7/2010 | Moriya | ............. G06T 11/008 382/131 |
| 2014/0185893 | A1* | 7/2014 | Ambwani | ............ G01R 33/481 382/131 |

* cited by examiner

*Primary Examiner* — Atiba O Fitzpatrick

(57) ABSTRACT

An MR apparatus 1 comprising an image producing unit 101 for producing axial images $D_1$ through $D_{10}$; a binarizing unit 102 for executing binarization processing for binarizing the axial images; a separating unit 103 for executing separation processing for separating a left-arm region HL and a right-arm region HR from a torso region HB; an extracting unit 104 for executing extraction processing for extracting the torso region HB from the images obtained by the separating unit 103; and a unit for locating a centerline of a body of a subject by executing first removal processing on an extracted region HE2 extracted by the extraction processing, and locating a centerline of the body of the subject based on the first-removal-processed extracted region.

10 Claims, 25 Drawing Sheets

| Localizer scan LS | Main scan MS |

FIG. 3

CENTERLINE DETERMINING APPARATUS, MEDICAL APPARATUS, AND PROGRAM

CROSS-REFERENCE TO RELATED APPLICATIONS

This application claims priority to Japanese patent application number 2015-254535, filed on Dec. 25, 2015, the entirety of which is incorporated herein by reference.

BACKGROUND

The present invention relates to a centerline determining apparatus for determining a centerline of a body, a medical apparatus for determining a centerline of a body, and a program applied to the centerline determining apparatus.

Magnetic resonance imaging apparatuses for imaging a subject using a contrast medium have been conventionally known.

An example of the method of imaging a subject using a contrast medium is one in which an operator visually finds a position of an aorta from within/among an image/images, and defines a tracker region for detecting the contrast medium at the position of the aorta.

An axial image of a cross section passing through a torso, a left arm, and a right arm of a subject is produced, and the axial image is binarized. By binarizing the axial image, a binary image is obtained. In the binary image, a region of the torso, a region of the left arm, and a region of the right arm in the subject are assigned with a logical value of one, while the outside of the body of the subject is assigned with a logical value of zero. After obtaining the binary image, erosion processing, region growing, and dilation processing are repeated to thereby achieve separation processing of separating the region of the left arm and region of the right arm from the region of the torso. Therefore, by performing the separation processing, a binary image in which the regions of the arms are separated from the region of the torso may be obtained. After performing the separation processing, extraction processing of extracting the region of the torso from the separation-processed binary image is executed to obtain a binary image in which the region of the torso is extracted. Next, a centerline in a right-left direction of the body of the subject is located based on the extraction-processed binary image. The located centerline of the body is then used to detect a position of a cerebrospinal fluid, and an aorta is detected based on the detected position of the cerebrospinal fluid. Since the aorta lies near the cerebrospinal fluid, the aorta may be detected by this prior art method.

The separation processing, however, sometimes fails to separate a region of one arm of the regions of the right and left arms from the region of the torso. In this case, the region of one arm connects with the region of the torso in the separation-processed binary image, so that when extraction processing is applied to the separation-processed binary image, the region extraction is applied to the region of the torso connected with the region of one arm. Therefore, when attempting to locate a centerline of a body based on the extraction-processed binary image, the located centerline of the body is offset toward the region of one arm with respect to an actual centerline of the body, which makes it difficult to detect a position of the cerebrospinal fluid. This results in a problem that a position of the aorta cannot be correctly detected.

It is therefore desirable to provide a technique capable of locating a centerline of a body with sufficient precision even in the case that a region that should not be extracted is wrongly extracted.

SUMMARY

The present invention, in its first aspect, is a centerline determining apparatus for determining a centerline of a body of a subject based on imaging data obtained from a part to be imaged including a torso part, a left-arm part, and a right-arm part of said subject, said apparatus comprising an image producing unit for producing an image including a first region representing a cross section of said torso part, a second region representing a cross section of said left-arm part, and a third region representing a cross section of said right-arm part based on said imaging data; a binarizing unit for executing binarization processing for binarizing said image to obtain a binary image in which said first region, said second region, and said third region are represented by a first logic and a region outside of said part to be imaged is represented by a second logic; a separating unit for executing separation processing for separating said second region and said third region included in said binary image from said first region included in said binary image; an extracting unit for executing extraction processing for extracting said first region from an image obtained by said separating means; and a unit for locating a centerline of the body of said subject by executing, in a case that said first region and one of said second region and said third region are included in an extracted region extracted by said extraction processing and the other of said second region and said third region is not included therein, first removal processing for removing said one region from said extracted region, and locating a centerline of the body of said subject based on said first-removal-processed extracted region.

The present invention, in its second aspect, is a medical apparatus comprising a scanning section for performing a scan for obtaining imaging data of a part to be imaged including a torso part, a left-arm part, and a right-arm part of a subject; an image producing unit for producing an image including a first region representing a cross section of said torso part, a second region representing a cross section of said left-arm part, and a third region representing a cross section of said right-arm part based on said imaging data; a binarizing unit for executing binarization processing for binarizing said image to obtain a binary image in which said first region, said second region, and said third region are represented by a first logic and a region outside of said part to be imaged is represented by a second logic; a separating unit for executing separation processing for separating said second region and said third region included in said binary image from said first region included in said binary image; an extracting unit for executing extraction processing for extracting said first region from an image obtained by said separating means; and a unit for locating a centerline of the body of said subject by executing, in a case that said first region and one of said second region and said third region are included in an extracted region extracted by said extraction processing and the other of said second region and said third region is not included therein, first removal processing for removing said one region from said extracted region, and locating a centerline of the body of said subject based on said first-removal-processed extracted region.

The present invention, in its third aspect, is a program for causing a computer to execute an image producing processing of producing, based on imaging data obtained from a part to be imaged including a torso part, a left-arm part, and a right-arm part of a subject, an image including a first region representing a cross section of said torso part, a second region representing a cross section of said left-arm part, and a third region representing a cross section of said right-arm part; a binarizing processing for binarizing said image to obtain a binary image in which said first region, said second region, and said third region are represented by a first logic and a region outside of said part to be imaged is represented by a second logic; a separating processing for separating said second region and said third region included in said binary image from said first region included in said binary image; an extracting processing for extracting said first region from an image obtained by said separating processing; and a processing of locating a centerline of the body of said subject by executing, in a case that said first region and one of said second region and said third region are included in an extracted region extracted by said extraction processing and the other of said second region and said third region is not included therein, first removal processing for removing said one region from said extracted region, and locating a centerline of the body of said subject based on said first-removal-processed extracted region.

In the case that one of a second region and a third region is included in an extracted region extracted by extraction processing, first removal processing is executed which removes the one of the regions from the region extracted by the extraction processing. Since a centerline of a body of a subject is then located based on a region obtained by the removal processing, an offset between a located centerline of the body and actual centerline of the body may be sufficiently reduced.

BRIEF DESCRIPTION OF THE DRAWINGS

FIG. 3 is a diagram showing scans performed in the present embodiment;

DETAILED DESCRIPTION

Now embodiments for practicing the invention will be described hereinbelow, although the present invention is not limited thereto.

Figure 1:
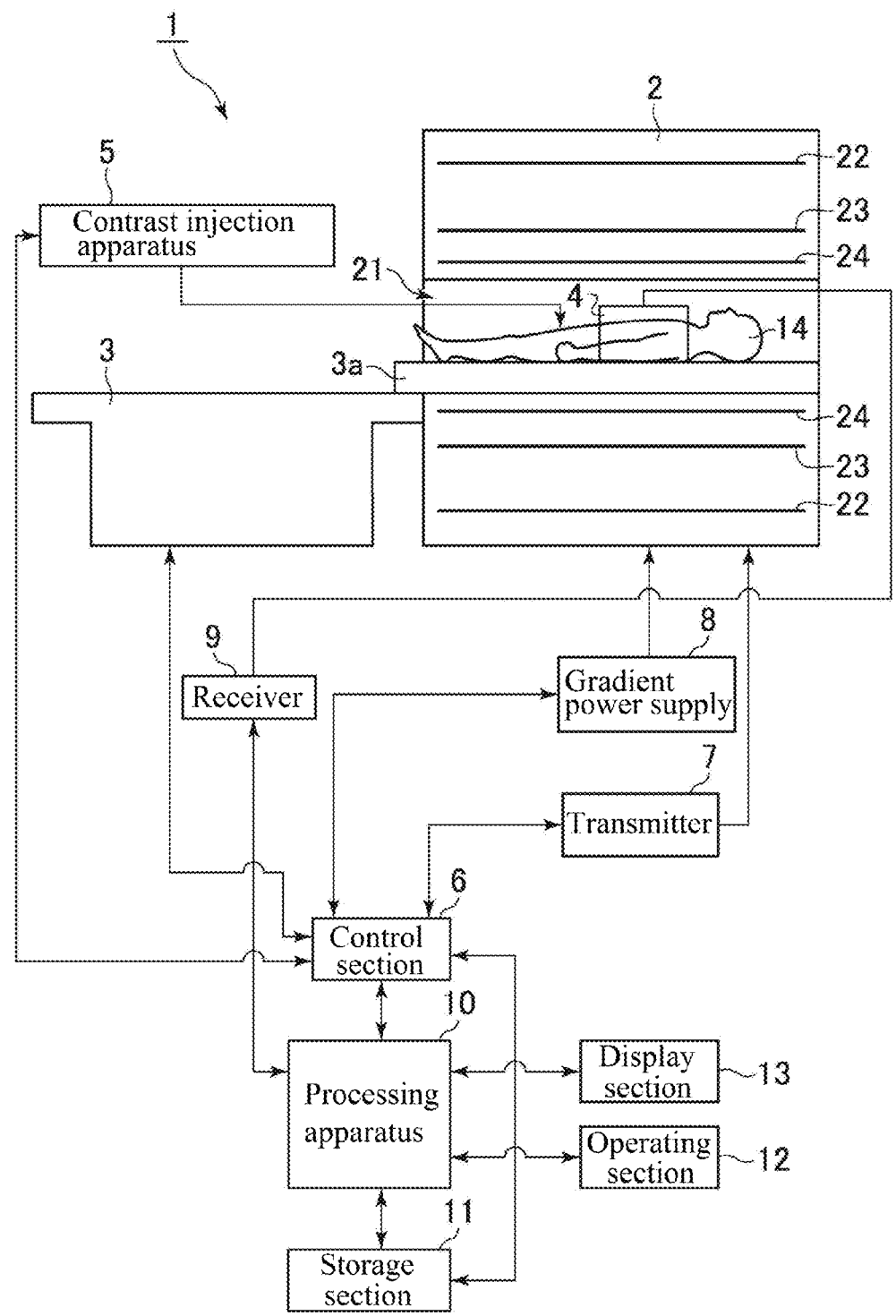
FIG. 1 is a schematic diagram of a magnetic resonance apparatus in one embodiment of the present invention.

FIG. 1 is a schematic diagram of a magnetic resonance apparatus in one embodiment of the present invention. The magnetic resonance apparatus (referred to as "MR apparatus" hereinbelow) 100 comprises a magnet 2, a table 3, a receive coil 4, and a contrast injection apparatus 5.

The magnet 2 has a reception space 21 in which a subject 14 is received. Moreover, the magnet 2 has a superconductive coil 22, a gradient coil 23, and an RF coil 24. The superconductive coil 22 applies a static magnetic field, the gradient coil 23 applies a gradient pulse, and the RF coil 24 applies an RF pulse. A permanent magnet may be employed in place of the superconductive coil 22.

The table 3 has a cradle 3a for carrying the subject 14. It is by the cradle 3a that the subject 14 is carried into the reception space 21.

The receive coil 4 is attached to the subject 14. The receive coil 4 receives magnetic resonance signals from the subject 14. The contrast injection apparatus 5 injects a contrast medium into the subject 14.

The MR apparatus 1 further comprises a control section 6, a transmitter 7, a gradient power supply 8, a receiver 9, a processing apparatus 10, a storage section 11, an operating section 12, and a display section 13.

The control section 6 receives from the processing apparatus 10 data containing waveform information, the timing of application, etc. of the RF pulse and gradient pulse used in a sequence. The control section 6 then controls the transmitter 7 based on the data for the RF pulse, and controls the gradient power supply 8 based on the data for the gradient pulse. The control section 6 also performs control of the start time for injection of the contrast medium by the contrast injection apparatus 5, control of movement of the cradle 3a, etc. While the control section 6 performs control of the contrast injection apparatus 5, transmitter 7, gradient power supply 8, cradle 3a, etc. in FIG. 1, the control of the contrast injection apparatus 5, transmitter 7, gradient power supply 8, cradle 3a, etc. may be performed by a plurality of control sections. For example, there may be separately provided a control section for controlling the contrast injection apparatus 5, that for controlling the transmitter 7 and gradient power supply 8, and that for controlling the cradle 3a.

The transmitter 7 supplies electric current to the RF coil 24 based on the data received from the control section 6. The gradient power supply 8 supplies electric current to the gradient coil 23 based on the data received from the control section 6.

The receiver 9 applies processing, such as demodulation/detection, to magnetic resonance signals received by the receive coil 4, and outputs the resulting signals to the processing apparatus 10. It should be noted that a combination of the magnet 2, receive coil 4, control section 6, transmitter 7, gradient power supply 8, and receiver 9 constitute the scanning section.

Figure 2:
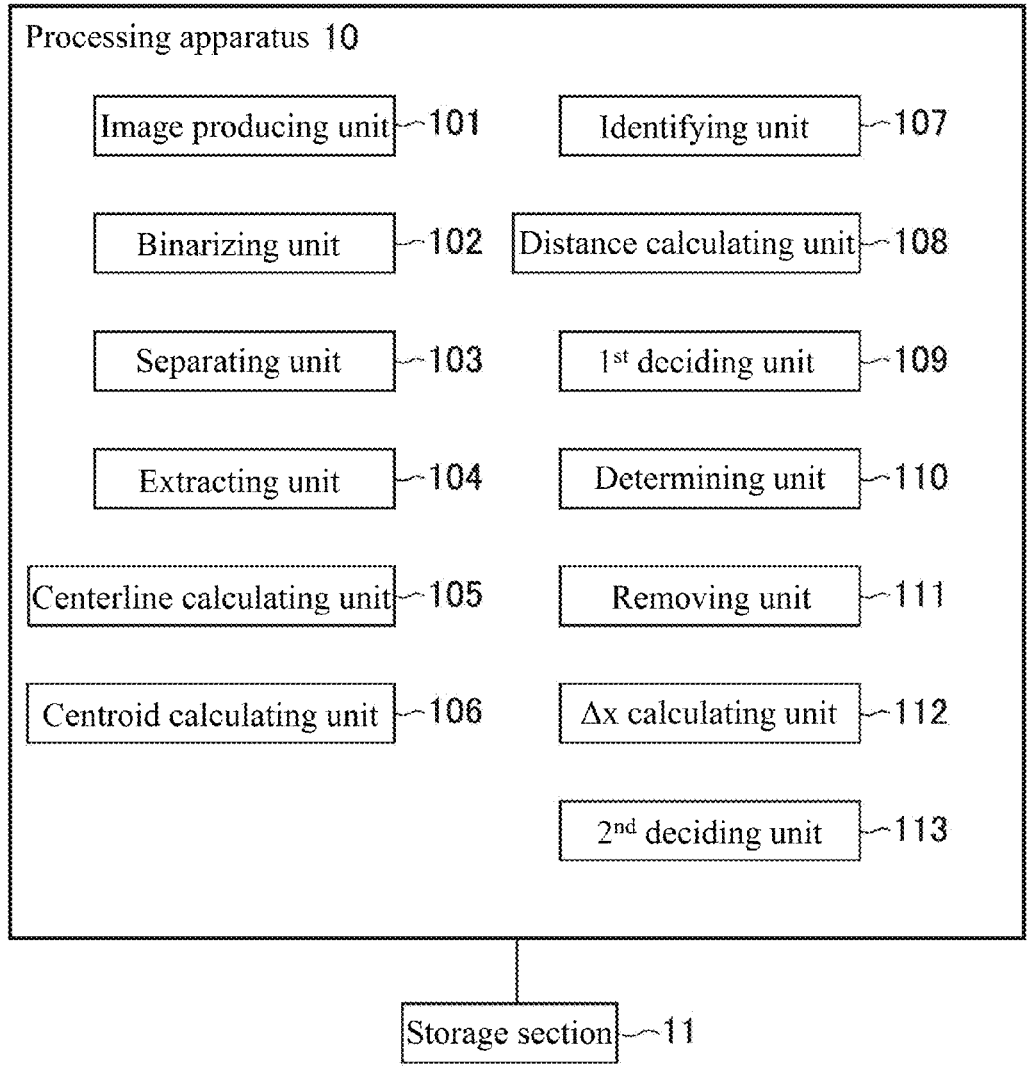
FIG. 2 is a diagram explaining units the processing apparatus 10 implements.

The storage section 11 stores therein programs executed by the processing apparatus 10, and the like. The storage section 11 may be a non-transitory storage medium, such as a hard disk or CD-ROM. The processing apparatus 10 loads a program stored in the storage section 11, and operates as a processor executing processing written in the program. By executing processing written in the program, the processing apparatus 10 implements several kinds of units. FIG. 2 is a diagram explaining the units the processing apparatus 10 implements.

Image producing unit 101 produces an image of a part to be imaged in the subject 14. Binarizing unit 102 executes binarization processing for binarizing the image obtained by the image producing unit. Separating unit 103 executes separation processing for separating a left-arm region and a right-arm region included in the binary image from a torso region included in the binary image. Extracting unit 104 executes extraction processing for extracting the torso region from the separation-processed binary image.

Centerline calculating unit 105 calculates a centerline representing a central position in an x-axis direction of the extracted region included in the extraction-processed binary image. Centroid calculating unit 106 calculates a centroid of the extracted region. Identifying unit 107 identifies a point that is in an axisymmetric positional relationship with the centroid with respect to the centerline. Distance calculating unit 108 calculates a distance d in the x-axis direction between the centroid and point. First deciding unit 109 decides whether the extracted region obtained by the extracting unit 104 is a first extracted region or a second extracted region, which will be discussed later. Determining unit 110 determines a centerline of a body. Removing unit 111 removes regions of arms from the extracted region. $\Delta x$ calculating unit 112 calculates $\Delta x$, which will be discussed later (see FIG. 17, for example). Second deciding unit 113 decides whether or not a remaining region of the arm has been removed.

The MR apparatus 1 comprises a computer including the processing apparatus 10. The processing apparatus 10 implements the image producing unit 101 to second deciding unit 113, etc. by loading programs stored in the storage section 11. The processing apparatus 10 may implement the image producing unit 101 to second deciding unit 113 by a single processor, or by two or more processors. Moreover, part of the image producing unit 101 to second deciding unit 113 may be executed by the control section 6. The programs executed by the processing apparatus 10 may be stored in a single storage section, or separately in a plurality of storage sections. The processing apparatus 10 constitutes the centerline determining apparatus. Referring back to FIG. 1, the description will be continued.

The operating section 12 is operated by an operator to input several kinds of information to the computer 8. The display section 13 displays several kinds of information. The MR apparatus 1 is configured as described above.

Figure 3:
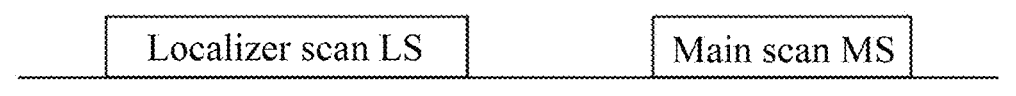
Figure 4:
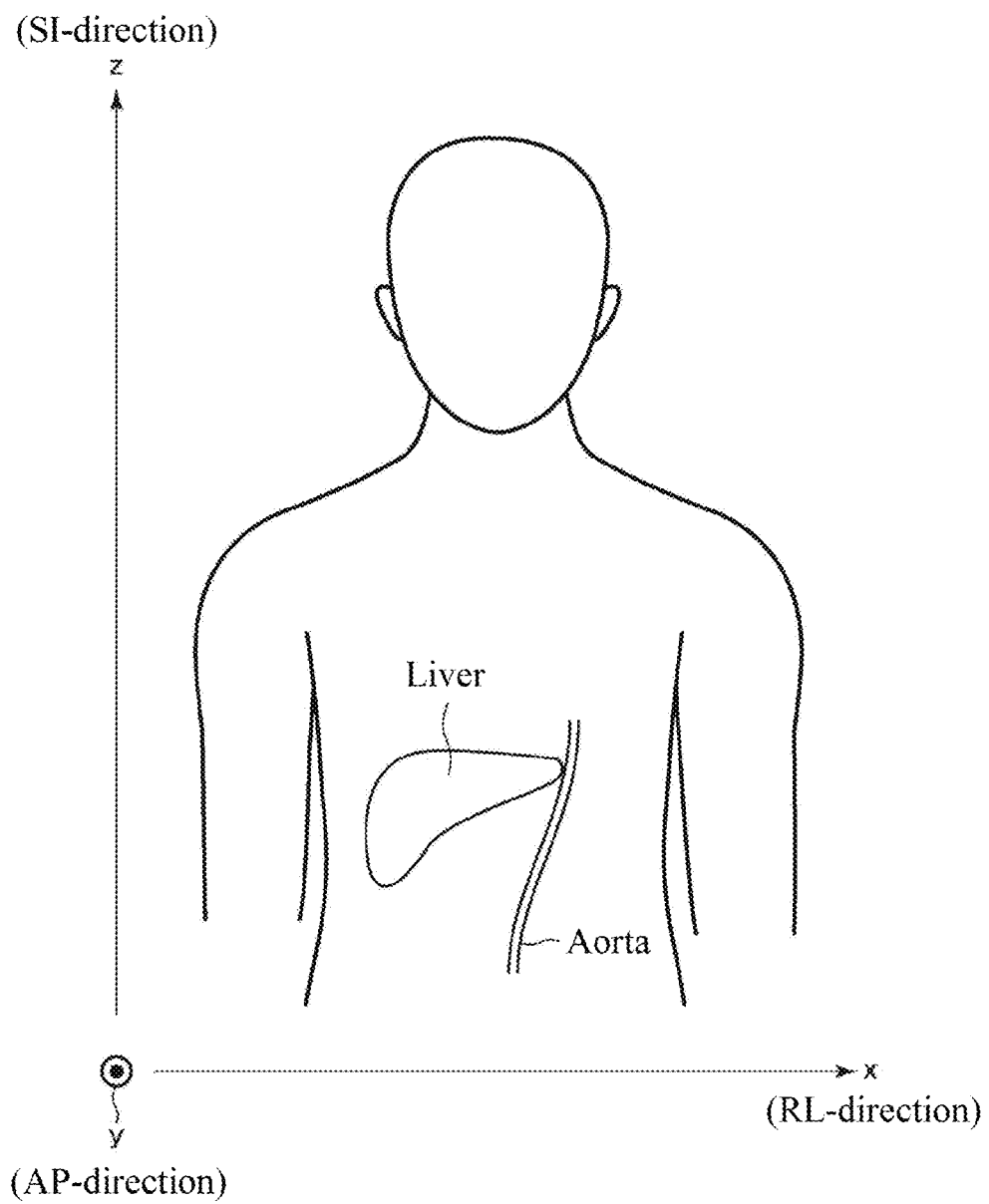
FIG. 4 is a diagram schematically showing a part to be imaged.

FIG. 3 is a diagram showing scans performed in the present embodiment, and FIG. 4 is a diagram schematically showing a part to be imaged. In FIG. 4, an x-axis direction, a y-axis direction, and a z-axis direction correspond to an RL (Right-Left) direction, an AP (Anterior-Posterior) direction, and an SI (Superior-Inferior) direction, respectively. In the present embodiment, a localizer scan LS, a main scan MS, etc. are performed.

The localizer scan LS is a scan for obtaining an image used for defining a range to be imaged or detecting an aorta. Subsequent to the localizer scan LS, the main scan MS is performed.

In the main scan MS, a contrast medium is injected into the subject, and a sequence for detecting the contrast medium from a tracker region $R_t$, which will be discussed later (see FIG. 25), is repetitively performed. Once a predetermined amount of the contrast medium has been injected into the tracker region, an imaging sequence for obtaining an image of the liver is performed. Now an exemplary flow in performing the localizer scan LS and main scan MS will be described below.

Figure 5:
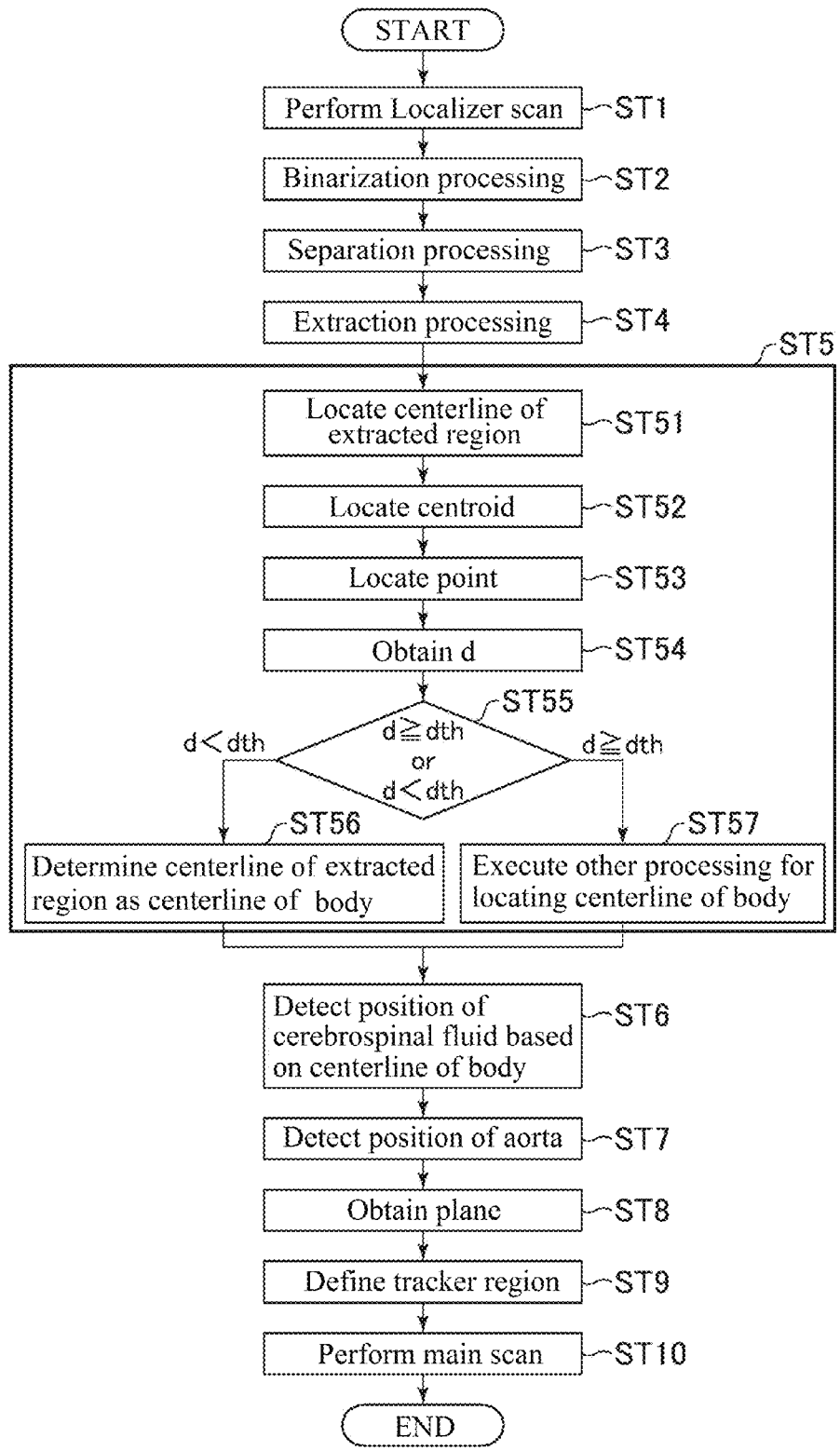
FIG. 5 is a diagram showing an exemplary flow representing several steps of processing in imaging a subject in the present embodiment.

FIG. 5 is a diagram showing an exemplary flow representing several steps of processing in imaging the subject in the present embodiment. At Step ST1, a localizer scan LS (see FIG. 3) is performed.

Figure 6:
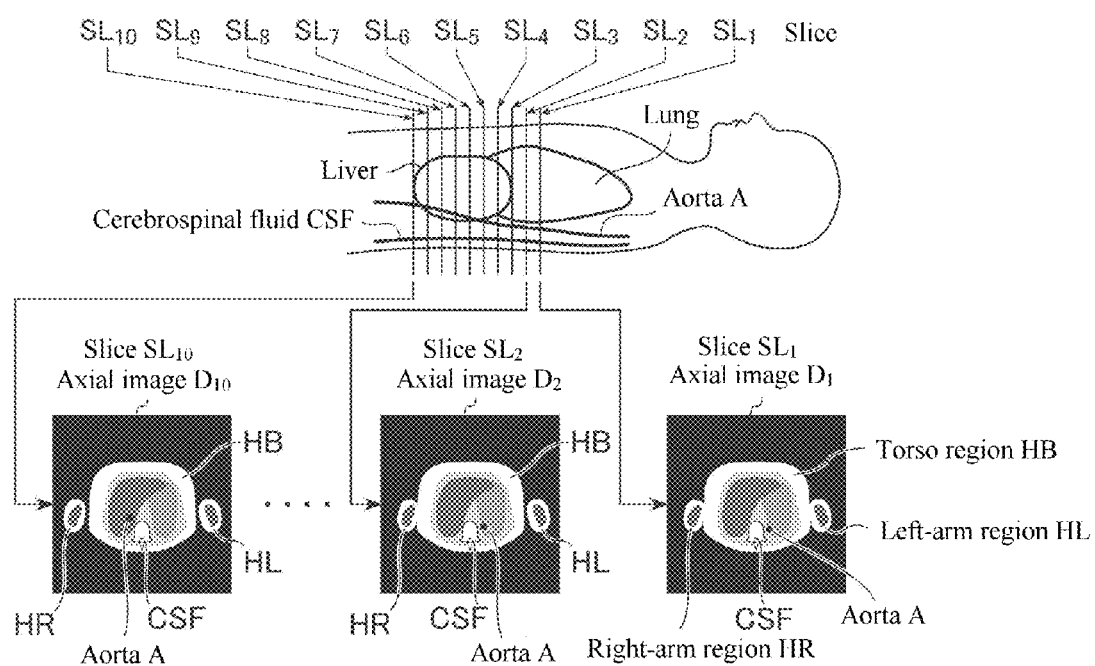
FIG. 6 is a diagram explaining a localizer scan LS.

FIG. 6 is a diagram explaining the localizer scan LS. The localizer scan LS is a scan for obtaining an image of a body part including the liver in the subject. FIG. 6 shows slices in performing the localizer scan LS. While the localizer scan LS obtains axial, sagittal, and coronal images, FIG. 6 shows m slices (where m=10 slices $SL_1$ to $SL_{10}$) for obtaining axial images, for convenience of explanation.

In performing the localizer scan LS, the control section 6 (see FIG. 1) sends data for an RF pulse in a sequence used in the localizer scan LS to the transmitter 7, and data for a gradient pulse in the sequence used in the localizer scan LS to the gradient power supply 8. The transmitter 7 supplies electric current to the RF coil 24 based on the data received from the control section 6, while the gradient power supply 8 supplies electric current to the gradient coil 23 based on the data received from the control section 6. Thus, the RF coil 24 applies an RF pulse, while the gradient coil 23 applies a gradient pulse. By performing the localizer scan LS, an MR signal is generated from the part to be imaged. The MR signal is received by the receive coil 4 (see FIG. 1). The receive coil 4 receives the MR signal and outputs an analog signal containing information on the MR signal. The receiver 9 applies signal processing, such as demodulation/detection, to the signal received from the receive coil 4, and outputs data resulting from the signal processing to the processing apparatus 10.

The image producing unit 101 (see FIG. 2) produces images $D_1$ to $D_{10}$ for the slices $SL_1$ to $SL_{10}$ based on the data acquired by the localizer scan LS (which images will be referred to as "axial images" hereinbelow). Since the slices $SL_1$ to $SL_{10}$ intersect the aorta A, the axial images $D_1$ to $D_{10}$ render cross sections of the aorta A.

An axial image includes three regions. The first one is a region HB representing a cross section of the torso of the subject (referred to hereinbelow as "torso region"), the second is a region HL representing a cross section of the left arm of the subject (referred to hereinbelow as "left-arm region"), and the third is a region HR representing a cross section of the right arm of the subject (referred to hereinbelow as "right-arm region").

The sequence used in the localizer scan LS is designed to inhibit as much as possible echo signals from blood with high flow velocity from being focused. Therefore, the signals from blood with high flow velocity may be fully diminished. Now consider the flow velocity of blood passing through the aorta A, for example: since the flow velocity of blood passing through the aorta A is high, signals from blood in the aorta A may be fully diminished. In FIG. 6, the aorta A is represented in black. After producing the axial images $D_1$ to $D_{10}$, the flow goes to Step ST2.

At Step ST2, the binarizing unit 102 uses a region growing method to apply binarization to each axial image.

Figure 7:
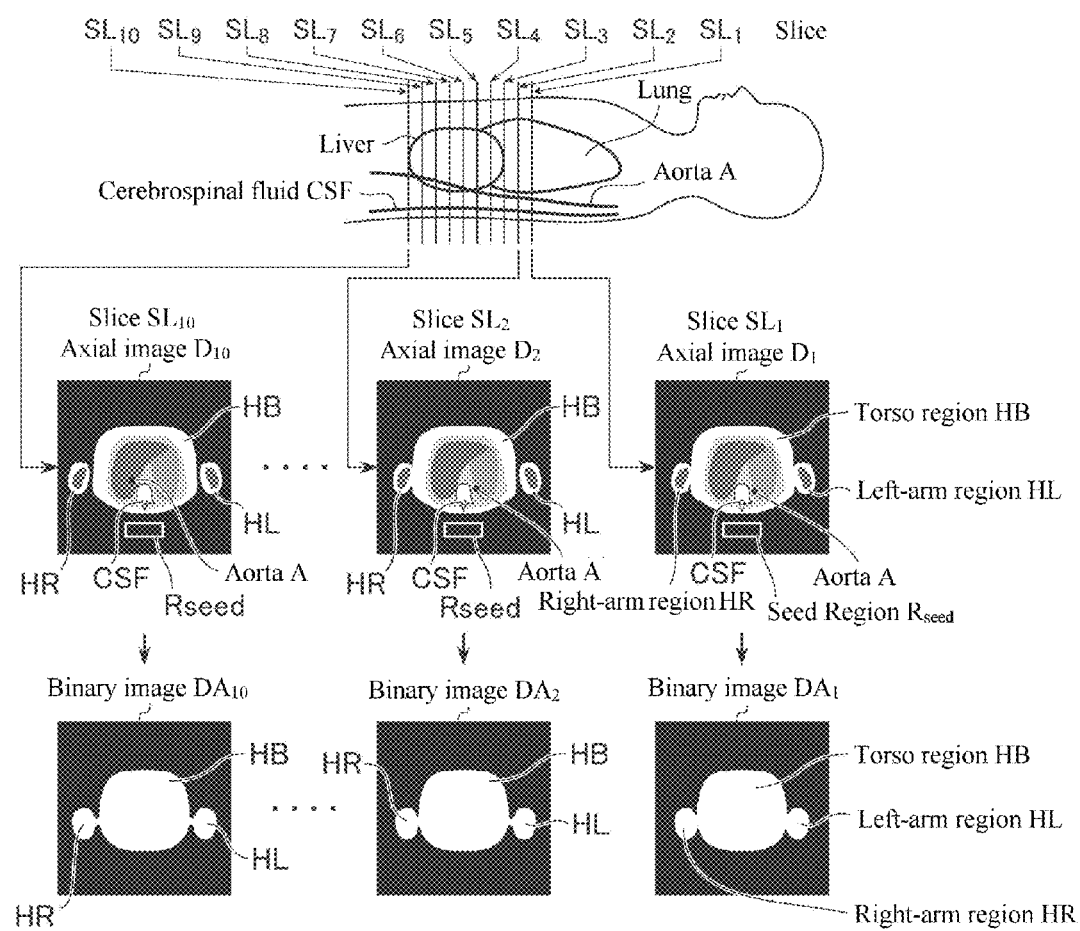
FIG. 7 is a diagram explaining binarization.

FIG. 7 is a diagram explaining the binarization. First, the binarizing unit 102 applies binarization to an axial image $D_1$. In applying binarization to the axial image $D_1$, the binarizing unit 102 defines a seed region $R_{seed}$ in a background region (a region outside of the body of the subject) in the axial image $D_1$. Methods of defining the seed region $R_{seed}$ in the background region include one that uses information on the position of the cradle 3a. Since the cradle 3a lies in the outside of the body of the subject, the seed region $R_{seed}$ may be defined in the background region (region outside of the body) without failure by defining the seed region $R_{seed}$ at the position of the cradle 3a. It should be noted that the operator may manually define the seed region $R_{seed}$.

After defining the seed region $R_{seed}$, the binarizing unit 102 obtains, based on signal values in the axial image $D_1$, a threshold v for the signal value used in distinguishing between the outside and the inside of the body of the subject.

There are the cradle 3a, air in the bore, etc. present in the outside of the body of the subject, where the signal value of the cradle 3a and that of the air are sufficiently smaller than that of tissues inside of the subject. The outside of the body and in-body tissues have such a significant difference in signal value that it is possible to obtain the threshold v of the signal value for distinguishing the outside and inside of the body of the subject based on the signal value in the axial image $D_1$ for the slice $SL_1$. An example of methods of obtaining the threshold v is one that uses signal values within the seed region $R_{seed}$. Since the seed region $R_{seed}$ is defined in the outside of the body of the subject, the signal value in the seed region $R_{seed}$ has a value (noise) sufficiently smaller than the signal value in the inside of the body of the subject. Therefore, by using the signal value in the seed region $R_{seed}$, the threshold v for the signal value for distinguishing between the outside and inside of the body of the subject may be obtained.

Next, the binarizing unit 102 binarizes the axial image $D_1$ for the slice $SL_1$ by comparing a signal value of a pixel with the threshold v and growing a region of the pixel having a signal value smaller than the threshold v. FIG. 7 schematically shows a binary image by symbol $DA_1$, which is obtained by binarizing the image $D_1$ for the slice $SL_1$ according to the region growing method. The signal value of a pixel in a major portion of the outside of the body of the subject is smaller than the threshold v, while that of a pixel in a major portion of the body surface of the subject is larger than the threshold v. Therefore, the region of the pixel is grown over the whole of the region outside of the body of the subject, whereas it is not grown into the region inside of the body of the subject, and thus, the background region (the outside of the body of the subject) and the inside of the body of the subject may be distinguished from each other. In FIG. 7, pixels in the grown region are indicated by a logical value of zero (black), while those in the other regions are indicated by a logical value of one (white).

In the present embodiment, the background region (the outside of the body of the subject) is assigned with a logical value of zero, while the inside of the body of the subject is assigned with a logical value of one. However, binarization may be applied so that the background region (the outside of the body of the subject) is assigned with a logical value of one, while the inside of the body of the subject is assigned with a logical value of zero.

Axial images for the other slices are subjected to the binarization by a similar method. While FIG. 7 shows only binary images $DA_1$, $DA_2$, and $DA_{10}$ for slices $SL_1$, $SL_2$, and $SL_{10}$ among the slices $SL_1$ to $SL_{10}$ for convenience of explanation, those for the other slices are also obtained. After applying the binarization, the flow goes to Step ST3.

Figure 8:
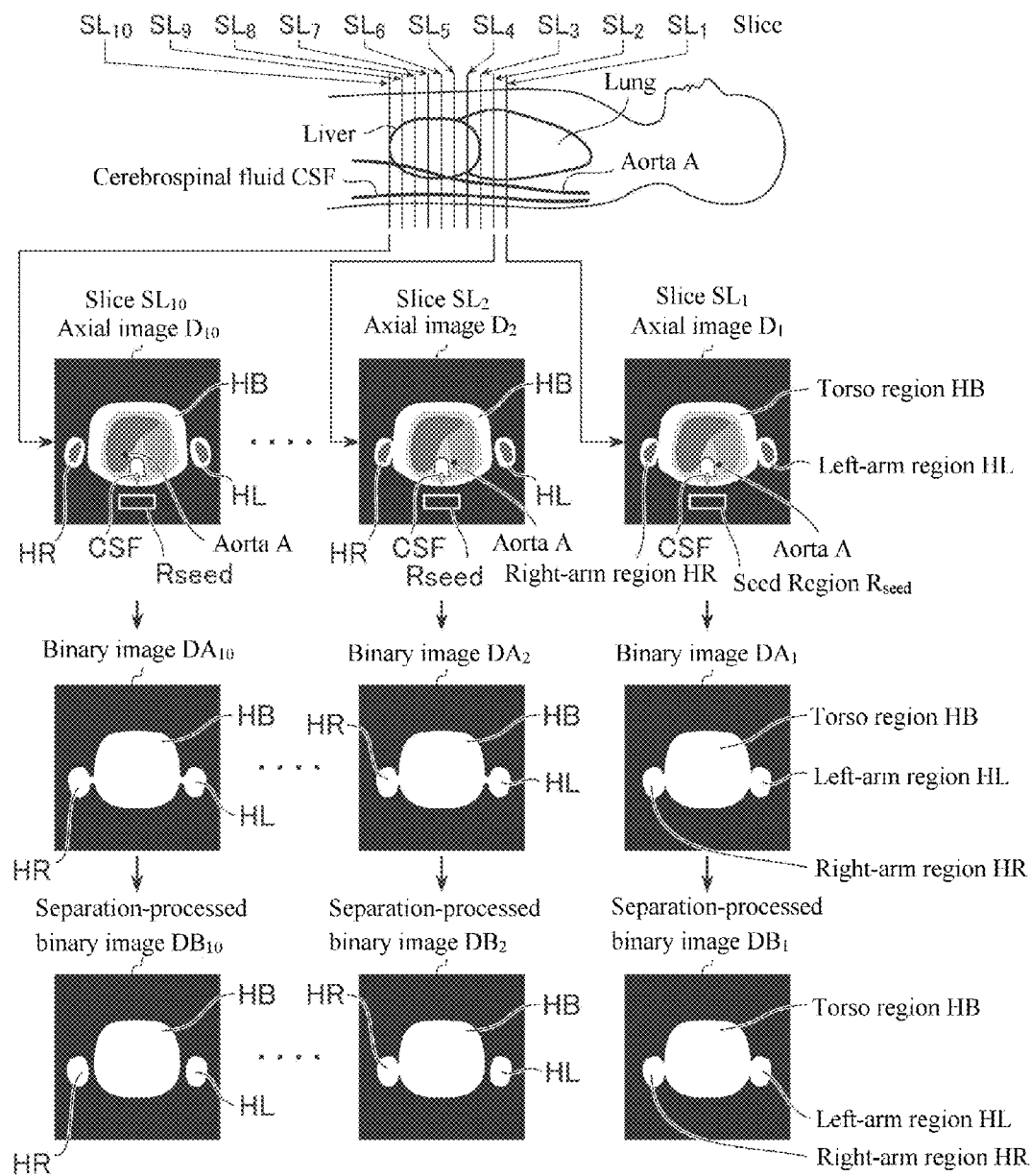
FIG. 8 is a diagram schematically showing binary images $DB_1$ to $DB_{10}$ after separation processing has been applied.

At Step ST3, the separating unit 103 (see FIG. 2) executes separation processing for separating the left-arm region HL and right-arm region HR from the torso region HB. The separation processing that may be employed is a method executing a series of processing including erosion processing and dilation processing one or more times, for example. Another method of the separation processing is, for example, one comprising applying distance transformation to the binary image, and after performing the distance transformation, applying Watershed transformation to the left-arm region HL and right-arm region HR so that they are labeled differently from the torso region HB. It is also possible to separate the left-arm region HL and right-arm region HR from the torso region HB by thus using the Watershed transformation. FIG. 8 schematically shows separation-processed binary images $DB_1$ to $DB_{10}$.

The binary image $DB_{10}$ shows a case in which the left-arm region HL and right-arm region HR are separated from the torso region HB by the separation processing. The binary image $DB_2$ shows an example in which the separation processing successfully separates the left-arm region HL from the torso region HB, but fails to separate the right-arm region HR from the torso region HB. The binary image $DB_1$ shows a case in which the separation processing is performed but it fails to separate both the left-arm region HL and the right-arm region HR from the torso region HB. After performing the separation processing, the flow goes to Step ST4.

Figure 9:
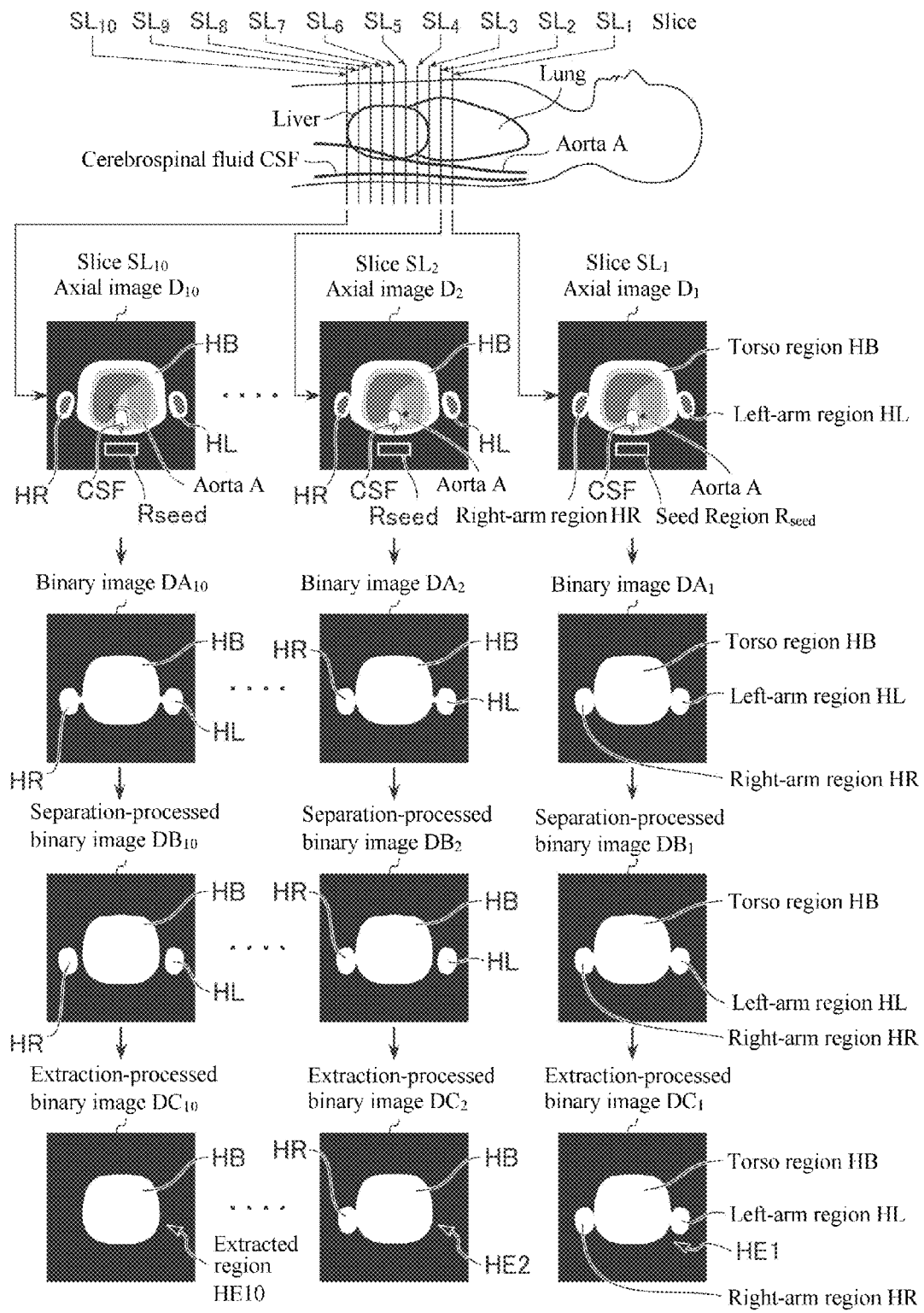
FIG. 9 is a diagram explaining extraction processing.

At Step ST4, the extracting unit 104 (see FIG. 2) performs extraction processing for extracting the torso region HB from the separation-processed binary images $DB_1$ to $DB_{10}$ resulting from the separation processing. FIG. 9 is a diagram explaining the extraction processing.

For convenience of explanation, the following description will first address the extraction processing for extracting the torso region HB from the separation-processed binary image $DB_{10}$.

The extracting unit 104 defines a seed region $R_{seed}$ in a central portion of the separation-processed binary image $DB_{10}$. Since the central portion of the separation-processed binary image $DB_{10}$ is a region of logical value of one, the seed region $R_{seed}$ is defined within a region of logical value of one. After defining the seed region $R_{seed}$, region growing is applied based on the seed region $R_{seed}$ to extract the region of logical value of one. This gives an extraction-processed binary image $DC_{10}$ having a region (referred to hereinbelow as "extracted region") HE10 obtained by the extraction processing. Since the separation-processed binary image $DB_{10}$ has both of the left-arm region HL and right-arm region HR separated from the torso region HB, only the torso region HB may be extracted by applying region growing based on the seed region $R_{seed}$. Therefore, the extracted region HE10 in the extraction-processed binary image $DC_{10}$ includes only the torso region HB.

Next, the extraction processing for extracting the torso region HB from the separation-processed binary image $DB_2$ will be described below.

The extracting unit 104 defines a seed region $R_{seed}$ in a central portion of the separation-processed binary image $DB_2$. Since the central portion of the separation-processed binary image $DB_2$ is a region of logical value of one, the seed region $R_{seed}$ is defined within a region of logical value of one. After defining the seed region $R_{seed}$, region growing is applied based on the seed region $R_{seed}$ to extract the region of logical value of one. This gives an extraction-processed binary image $DC_2$ having an extracted region HE2. Although the left-arm region HL is separated from the torso region HB, the right-arm region HR is not separated from the torso region HB, being connected with the torso region HB in the separation-processed binary image $DB_2$. Therefore, by performing region growing based on the seed region $R_{seed}$ in the separation-processed binary image $DB_2$, the right-arm region HR, in addition to the torso region HB, is extracted. Therefore, the extracted region HE2 in the extraction-processed binary image $DC_2$ includes the torso region HB and right-arm region HR.

Next, the extraction processing for extracting the torso region HB from the separation-processed binary image $DB_1$ will be described below.

The extracting unit 104 defines a seed region $R_{seed}$ in a central portion of the separation-processed binary image $DB_1$. Since the central portion of the separation-processed binary image $DB_1$ is a region of logical value of one, the seed region $R_{seed}$ is defined within a region of logical value of one. After defining the seed region $R_{seed}$, region growing is applied based on the seed region $R_{seed}$ to extract the region of logical value of one. This gives an extraction-processed binary image $DC_1$ having an extracted region HE1. In the separation-processed binary image $DB_1$, the left-arm region HL and right-arm region HR are not separated from the torso region HB, being connected with the torso region HB. Therefore, by applying region growing based on the seed region $R_{seed}$, the left-arm region HL and right-arm region HR, in addition to the torso region HB, are extracted. Consequently, the extracted region HE1 in the extraction-processed binary image $DC_1$ includes the torso region HB, left-arm region HL, and right-arm region HR. After applying the extraction processing, the flow goes to Step ST5.

At Step ST5, processing for locating a centerline representing a central position in the x-axis direction (right-left direction) of the body of the subject is executed on an axial image-by-axial image basis. Now Step ST5 will be described below.

Figure 10:
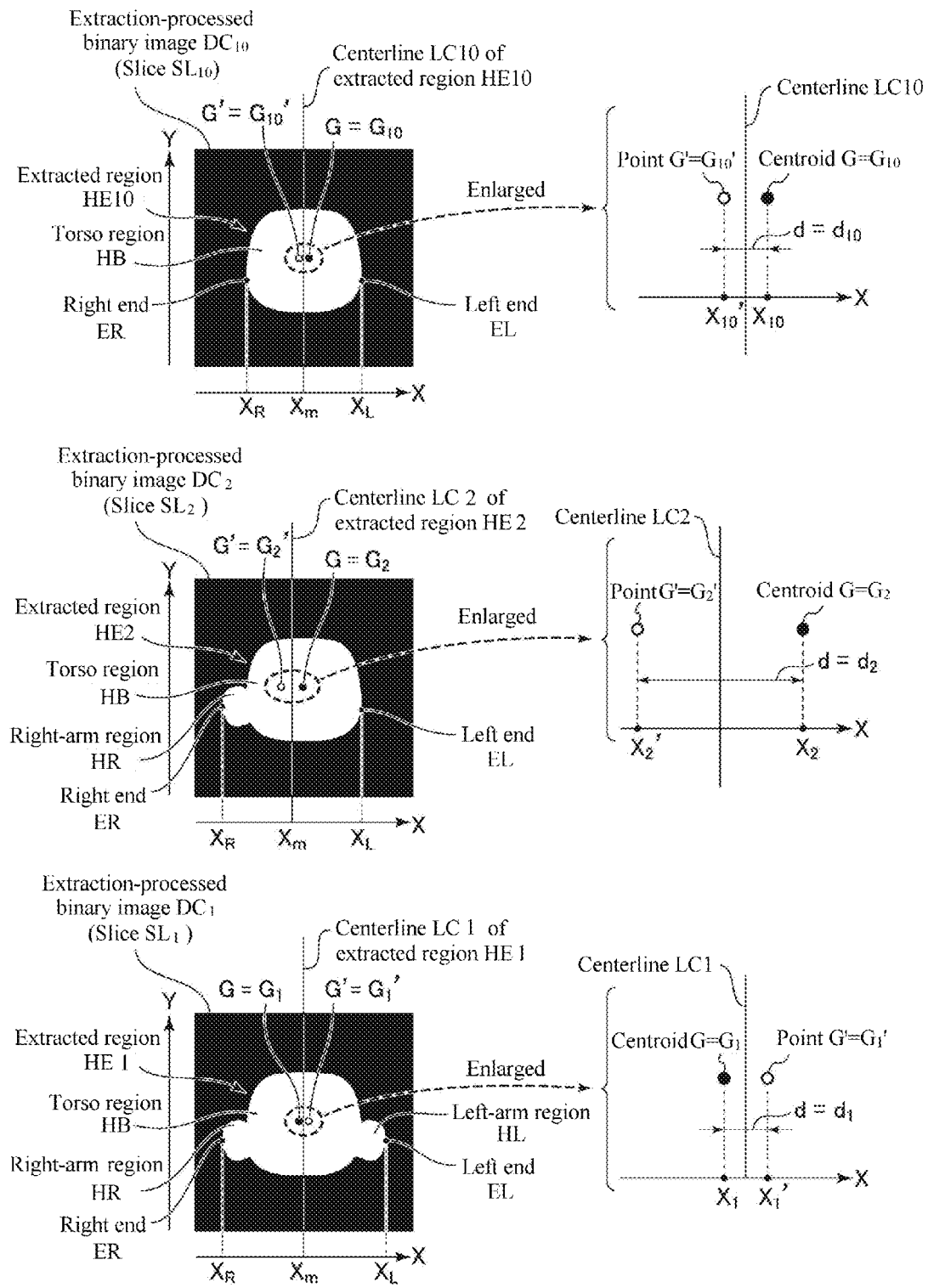
FIG. 10 is a diagram explaining Step ST5.

FIG. 10 is a diagram explaining Step ST5. Step ST5 has Steps ST51 to ST57, which will be described one by one.

For convenience of explanation, FIG. 10 specifically shows only binary images $DC_1$, $DC_2$, and $DC_{10}$ among the extraction-processed binary images $DC_1$ to $DC_{10}$.

At Step ST51, the centerline calculating unit 105 (see FIG. 2) locates a centerline (the first centerline) representing a central position in the x-axis direction of each of the extracted regions HE1 to HE10. In FIG. 10, centerlines LC1, LC2, and LC10 of the extracted regions HE1, HE2, and HE10 among the extracted regions HE1 to HE10 are specifically shown. The centerline calculating unit 105 obtains a coordinate value $x_R$ in the x-axis direction of a right end (an end on the right-arm side) ER of each of the extracted regions HE1 to HE10, and a coordinate value $x_L$ in the x-axis direction of a left end (an end on the left-arm side) EL of each of the extracted regions HE1 to HE10, and locates a line passing through a coordinate value $x_m$ of a position in the middle in the x-axis direction of these coordinate values $x_R$ and $x_L$ as centerlines LC1 to LC10 of the extracted regions HE1 to HE10. After locating the centerlines LC1 to LC10 of the extracted regions HE1 to HE10, the flow goes to Step ST52.

At Step ST52, the centroid calculating unit 106 (see FIG. 2) calculates a position of a centroid G (the first centroid) for each of the extracted regions HE1 to HE10. FIG. 10 specifically shows centroids $G=G_1$, $G_2$, and $G_{10}$ of the extracted regions HE1, HE2, and HE10 among the extracted regions HE1 to HE10. The centroid G is indicated by a solid circle. The position of the centroid G may be found based on coordinate values in the x- and y-axis directions of each pixel in the extracted region. The coordinates x in the x-axis direction of the centroids $G_1$, $G_2$, and $G_{10}$ are represented by $x=x_1$, $x_2$, and $x_{10}$, respectively. After locating the centroid G, the flow goes to Step ST53.

At Step ST53, the identifying unit 107 (see FIG. 2) identifies a point G' (the first point) that is in an axisymmetric positional relationship with the centroid G with respect to the centerline in each of the extraction-processed binary images $DC_1$ to $DC_{10}$. FIG. 10 specifically shows points $G'=G_1'$, $G_2'$, and $G_{10}'$ of the extraction-processed binary images $DC_1$, $DC_2$, and $DC_{10}$ among the extraction-processed binary images $DC_1$ to $DC_{10}$. The coordinates x in the x-axis direction of the points $G_1'$, $G_2'$, and $G_{10}'$ are represented by $x=x_1'$, $x_2'$, and $x_{10}'$, respectively. After locating the point G', the flow goes to Step ST54.

At Step ST54, the distance calculating unit 108 (see FIG. 2) obtains a distance d between the centroid G and point G'. FIG. 10 specifically shows distances $d=d_1$, $d_2$, and $d_{10}$ in the extraction-processed binary images $DC_1$, $DC_2$, and $DC_{10}$ among the extraction-processed binary images $DC_1$ to $DC_{10}$. After obtaining the distance d, the flow goes to Step ST55.

At Step ST55, the first deciding unit 109 (see FIG. 2) makes a decision based on the distance d as to which of a first extracted region and a second extracted region each of the extracted regions HE1 to HE10 is, wherein the first and second extracted regions are as follows:

(1) first extracted region: an extracted region that includes none or both of the left-arm region HL and right-arm region HR; and (2) second extracted region: an extracted region that includes one of the left-arm region HL and right-arm region HR and does not include the other. In the following description, a principle of a method making the decision will be described first.

Let us consider first the extraction-processed binary image $DC_{10}$ (see the upper row in FIG. 10). Since the extracted region HE10 in the extraction-processed binary image $DC_{10}$ includes only the torso region HB, the extracted region HE10 may be regarded as having a generally symmetric shape with respect to the centerline LC of the extracted region HE10. Therefore, in the extraction-processed binary image $DC_{10}$, the point $G_{10}'$ overlies the centroid $G_{10}$ ($d_{10}=0$), or the distance $d=d_{10}$ has a value near zero. Next, consider the extraction-processed binary image $DC_1$ (see the lower row in FIG. 10). The extracted region HE1 in the extraction-processed binary image $DC_1$ includes, unlike the extracted region HE10, the left-arm region HL and right-arm region HR, in addition to the torso region HB. However, the sizes of the left-arm region HL and right-arm region HR may be regarded as generally equal, so that the extracted region HE1 may be regarded as having a generally symmetric shape with respect to the centerline LC1. Therefore, in the extraction-processed binary image $DC_1$, the point $G_1'$ overlies the centroid $G_1$ ($d_1=0$), or the distance $d=d_1$ has a value near zero.

From the considerations above, in the case that the distance d has a small value in the extracted region, the extracted region may be considered to include none of the left-arm region HL and right-arm region HR (extracted region HE10), or include both of the left-arm region HL and right-arm region HR (extracted region HE1).

Next, consider the extraction-processed binary image $DC_2$ (see the middle row in FIG. 10). The extracted region HE2 in the extraction-processed binary image $DC_2$ includes the right-arm region HR, in addition to the torso region HB, and does not include the left-arm region HL. Therefore, for the extracted region HE2, the shape of the region on the left relative to the centerline LC2 and that of the region on the right relative to the centerline LC2 are significantly different from each other. Thus, in the extraction-processed binary image $DC_2$, the distance d ($=d_2$) between the point $G_2$' and centroid $G_2$ has a large value. In other words, in the case that the distance d has a large value in an extracted region, the extracted region may be considered not to include one of the left-arm region HL and right-arm region HR and considered to include the other region.

Accordingly, in the present embodiment, a threshold dth for deciding whether the distance d has a small value or a large value is set beforehand, and the distance d and threshold dth are compared with each other. When d<dth, the extracted region is decided to be the first extracted region, which includes none or both of the left-arm region HL and right-arm region HR, whereas when d≥dth, the extracted region is decided to be the second extracted region, which includes one of the left-arm region HL and right-arm region HR and does not include the other region. The value dth may be several millimeters, for example.

Figure 11:
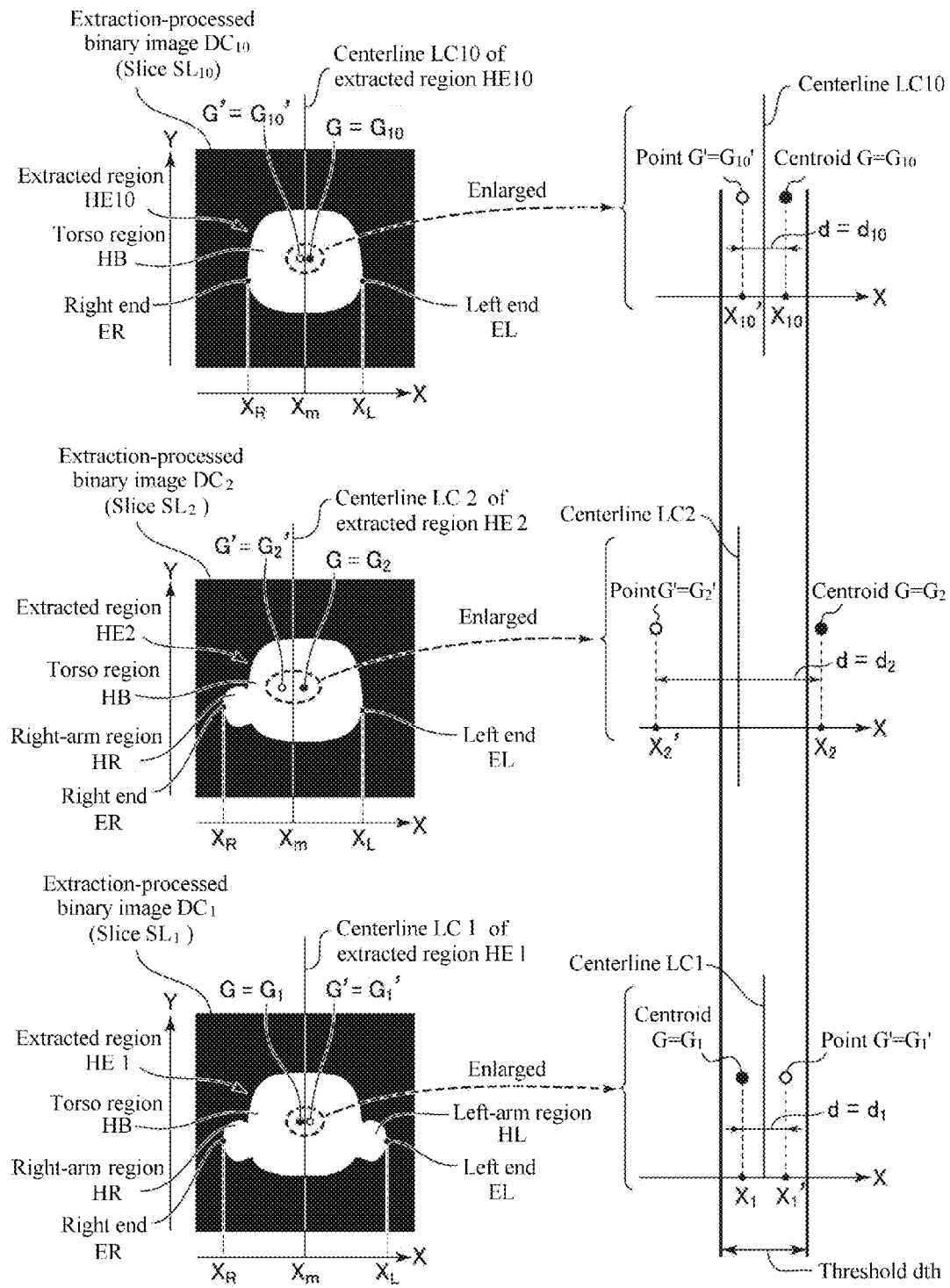
FIG. 11 is a diagram explaining a process of comparing a distance d with a threshold $d_{th}$ to make a decision.

FIG. 11 is a diagram explaining a process of comparing the distance d with the threshold dth to make the decision described above. The first deciding unit 109 compares the distance d with the threshold dth. Referring to FIG. 11, $d_1$<dth in the binary image $DC_1$ (the lower row in FIG. 11), and $d_{10}$<dth in the binary image $DC_{10}$ (the upper row in FIG. 11). Therefore, the first deciding unit 109 decides that the extracted regions HE1 and HE10 are regions including none or both of the left-arm region HL and right-arm region HR. When an extracted region includes none or both of the left-arm region HL and right-arm region HR, the centerline of the extracted region may be considered to be the centerline of the body. Accordingly, when d<dth, the flow goes to Step ST56, where the determining unit 110 (see FIG. 2) determines the centerline of the extracted region as the centerline of the body.

On the other hand, $d_2$>dth in the binary image $DC_2$ (the middle row in FIG. 11). Therefore, the first deciding unit 109 decides that the extracted region HE2 is a region including one of the left-arm region HL and right-arm region HR and does not include the other region. When thus-decided, the centerline LC2 of the extracted region HE2 may be considered to be significantly offset from the centerline of the body due to an effect of the one region that has failed to be removed and is left. Therefore, when d≥dth, the centerline of the extracted region cannot be regarded as the centerline LB of the body. Accordingly, when d≥dth, the flow goes to Step ST57, and processing for determining a centerline LB of the body is performed. Now Step ST57 will be described below.

Figure 12:
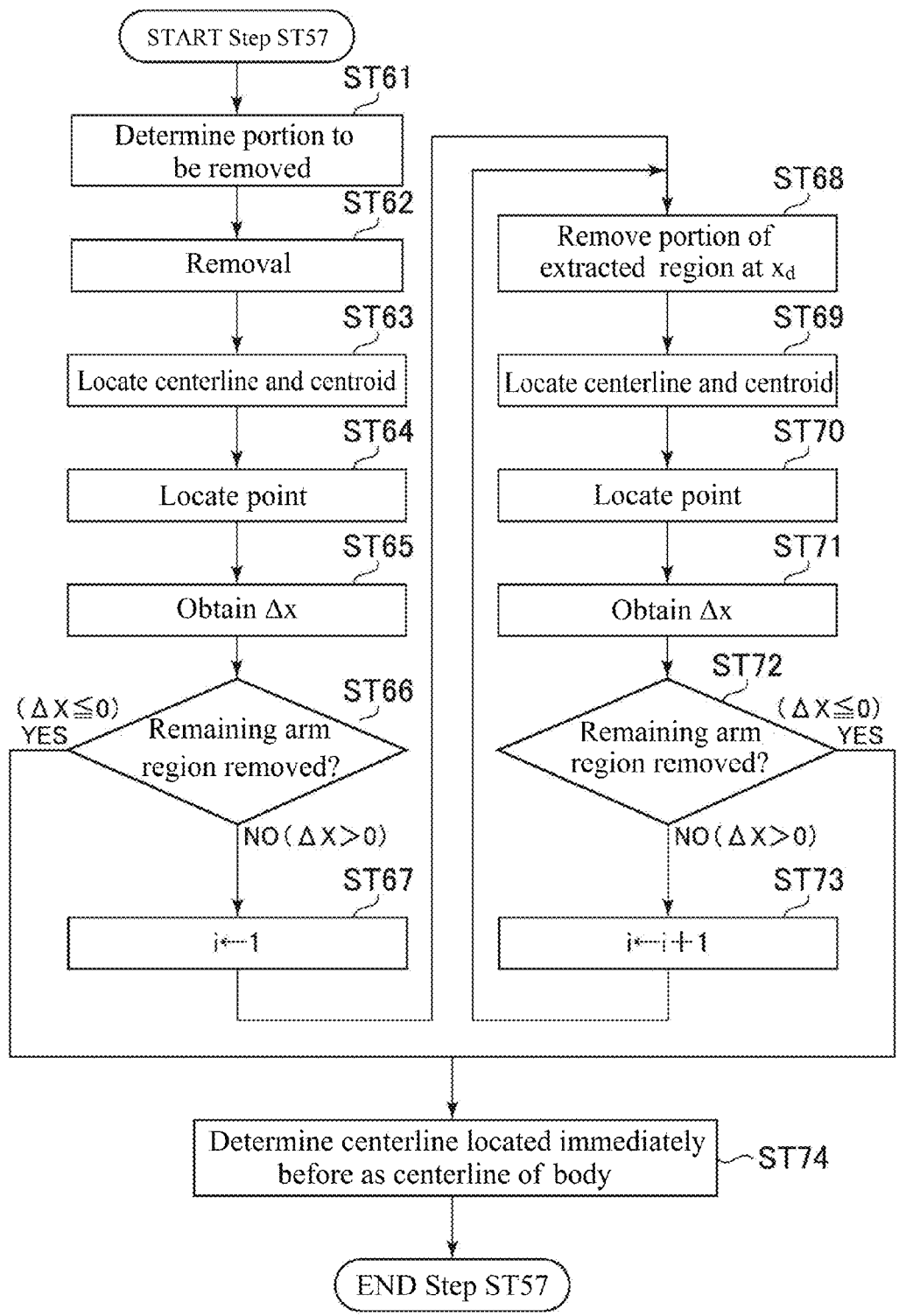
FIG. 12 is a diagram showing an exemplary specific flow at Step ST57.

FIG. 12 is a diagram showing an exemplary specific flow at Step ST57. Step ST57 has Steps ST61 to ST74, which will be described one by one.

Figure 13:
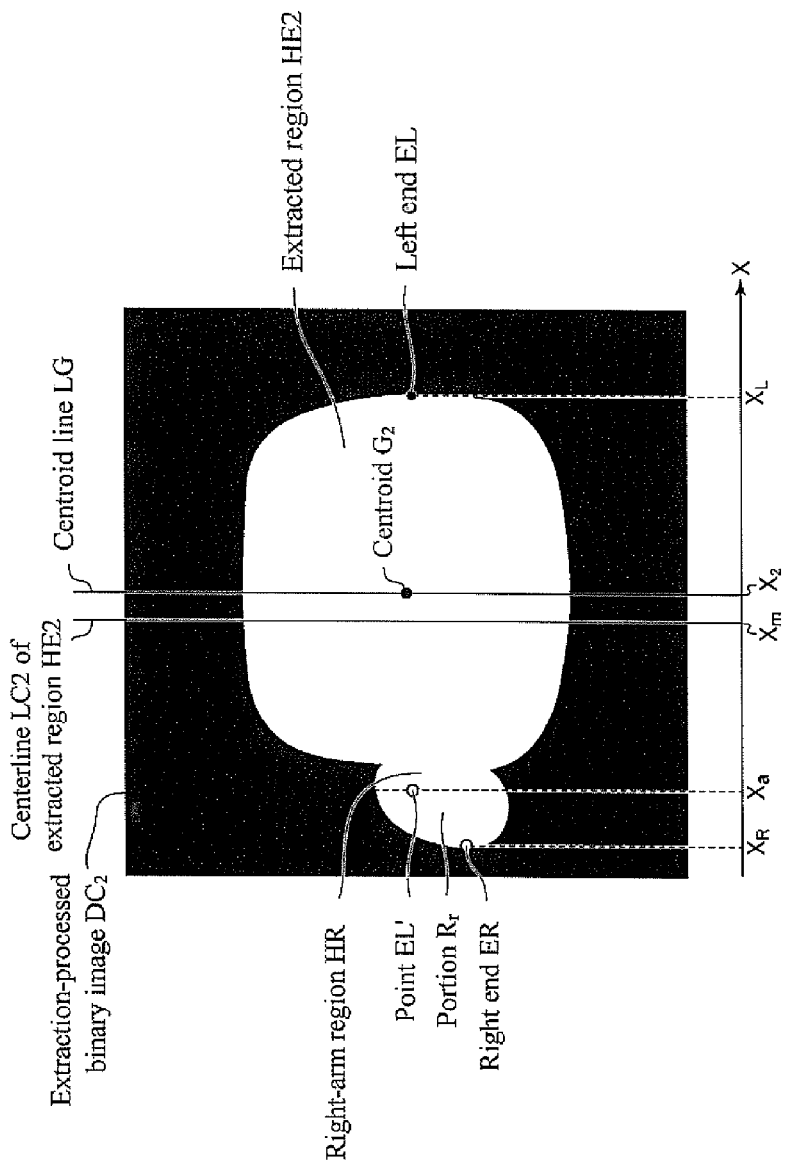
FIG. 13 is a diagram explaining a process of determining a portion to be removed.

At Step ST61, the removing unit 111 (see FIG. 2) determines a portion to be removed of the right-arm region HR from within the extracted region HE2 in the binary image $DC_2$ (see FIG. 13).

FIG. 13 is a diagram explaining a process of determining a portion to be removed. At Step ST61, the removing unit 111 first identifies one of the left end EL and right end ER of the extracted region HE2 that lies on the side of the centroid $G_2$ with respect to the centerline LC2 of the extracted region HE2. Here, the one of the left end EL and right end ER that lies on the side of the centroid $G_2$ with respect to the centerline LC2 of the extracted region HE2 is the left end EL. Therefore, the removing unit 111 identifies the left end EL.

Next, the removing unit 111 locates a point EL' that is in an axisymmetric positional relationship with the left end EL identified as above with respect to a centroid line LG (a line representing a coordinate $x=x_2$ of the centroid $G_2$ in the x-axis direction). In FIG. 13, the coordinate of the point EL' in the x-axis direction is represented by $x=x_a$. After locating the point EL', the removing unit 111 determines a portion 12, between the position $x_R$ of the right end ER and position $x_a$ of the point EL' from within the extracted region HE2 as the portion to be removed. After determining the portion 12, to be removed, the flow goes to Step ST62.

Figure 14:
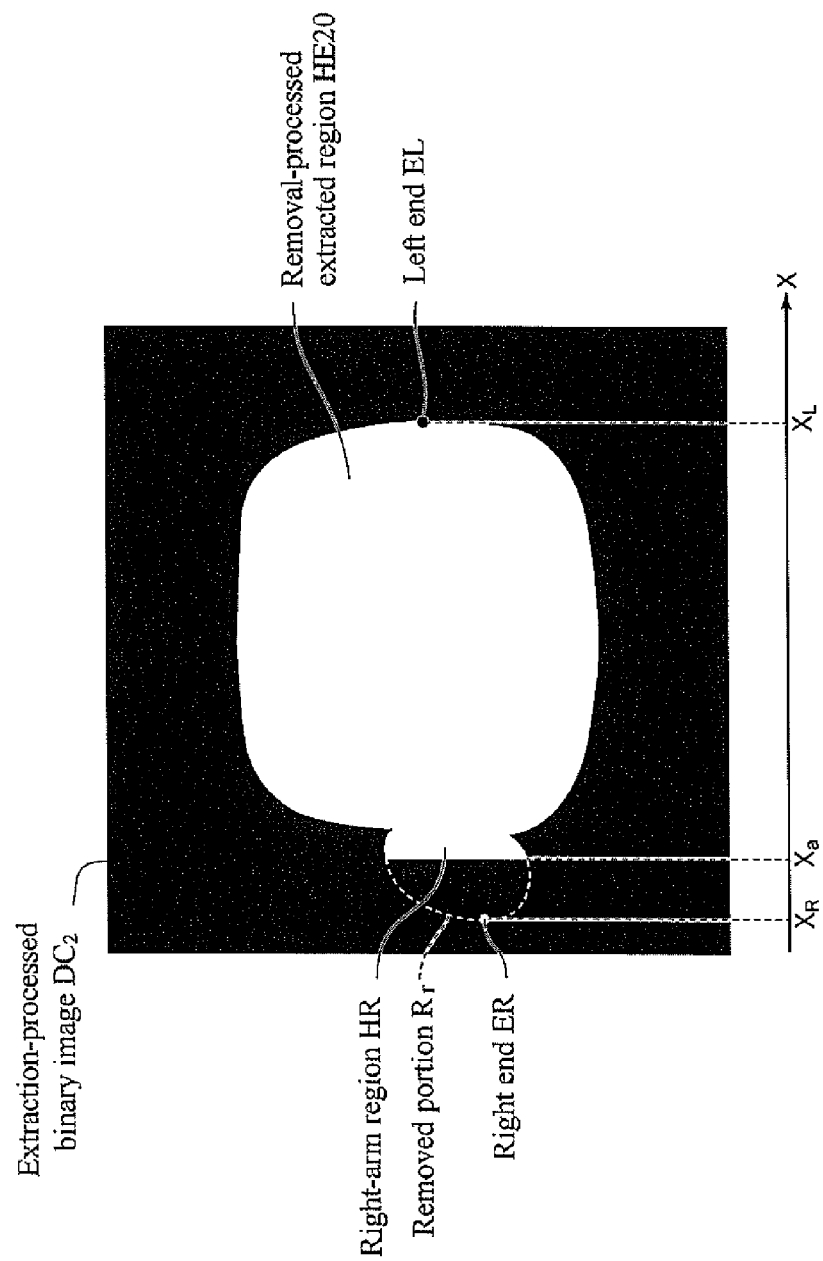
FIG. 14 is a diagram showing a removal-processed extracted region.

At Step ST62, the removing unit 111 executes removal processing (the first removal processing) for removing the portion 12, determined at Step ST61. Specifically, the removing unit 111 modifies the pixel value of pixels contained in the portion 12, (from $x_R$ to $x_a$) in the extracted region HE2 from a logical value of one to a logical value of zero. Thus, the portion $R_r$ in the extracted region HE2 may be removed. FIG. 14 shows the removal-processed extracted region. In FIG. 14, the removal-processed extracted region is designated by symbol "HE20." After removing the portion $R_r$, the flow goes to Step ST63.

Figure 15:
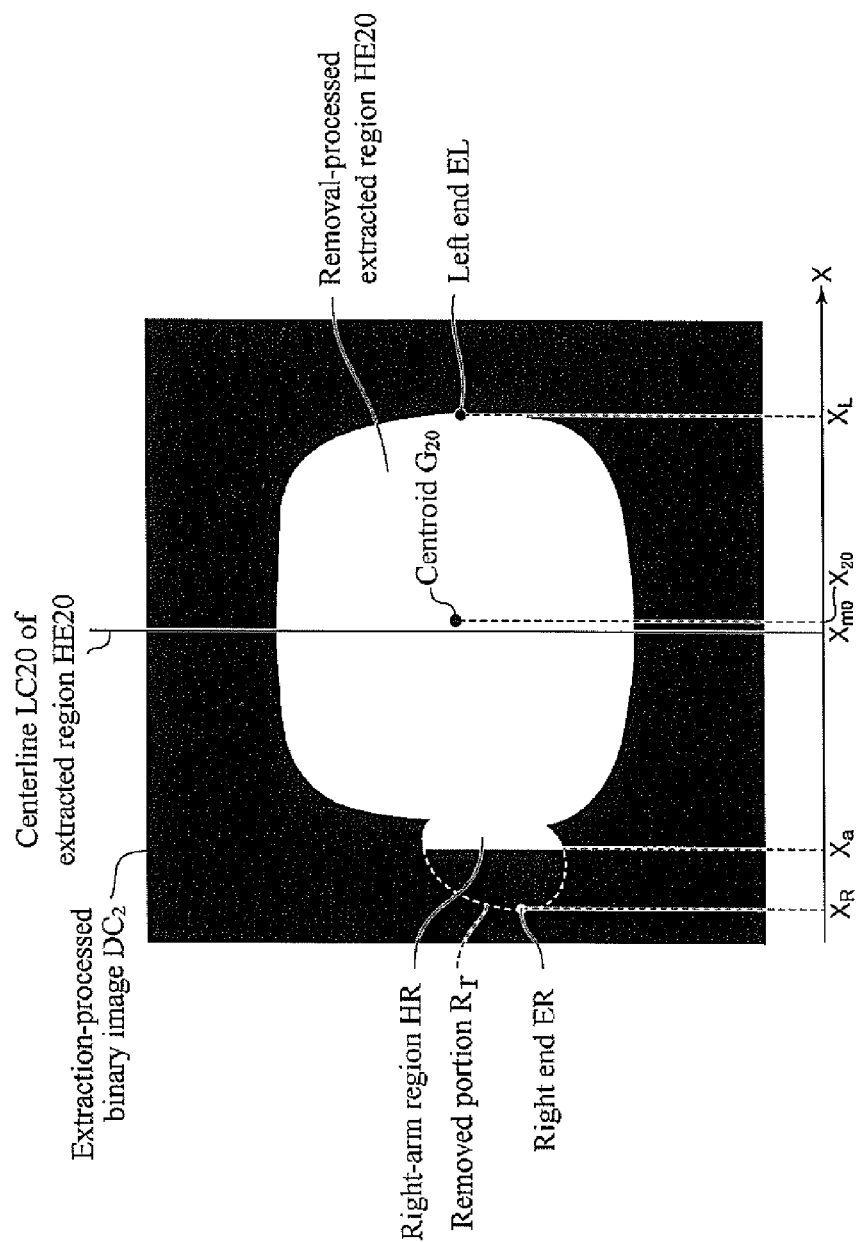
FIG. 15 is a diagram showing a centerline LC20 and a centroid $G_{20}$.

At Step ST63, the centerline calculating unit 105 calculates a centerline (the second centerline) of the extracted region HE20 obtained by the removal processing at Step ST62, and the centroid calculating unit 106 calculates a centroid (the second centroid) of the extracted region HE20. FIG. 15 shows thus-located centerline LC20 and centroid $G_{20}$. The position of the centroid $G_{20}$ in the x-axis direction is designated by $x=x_{20}$. After locating the centerline LC20 and centroid $G_{20}$, the flow goes to Step ST64.

Figure 16:
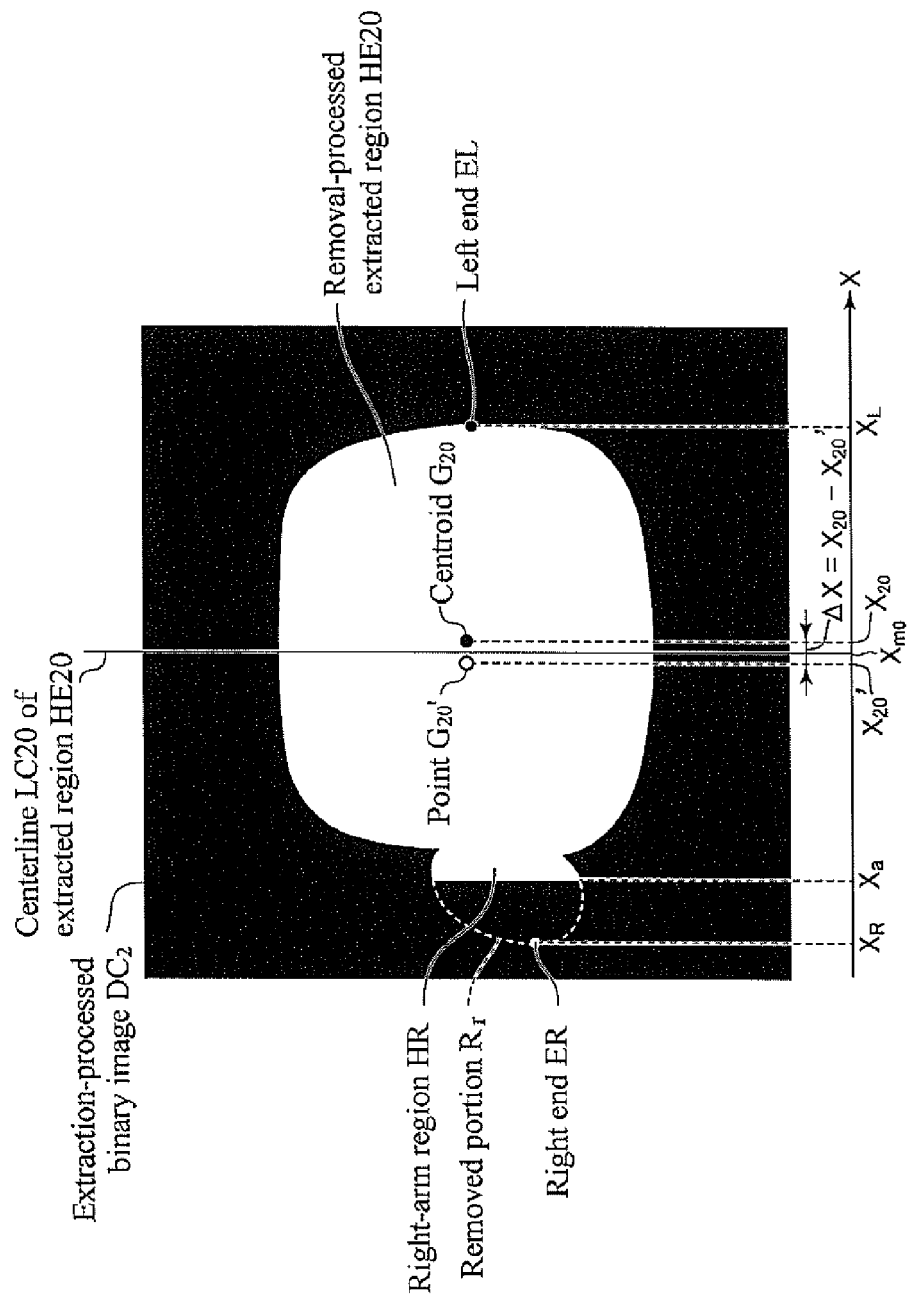
FIG. 16 is a diagram showing an identified point $G_{20}'$.

At Step ST64, the identifying unit 107 identifies a point $G_{20}$' (the second point) that is in an axisymmetric positional relationship with the centroid $G_{20}$ with respect to the centerline LC20. FIG. 16 shows a thus-identified point $G_{20}$'. The position of the point $G_{20}$' in the x-axis direction is designated by $x=x_{20}$'. After locating the point $G_{20}$', the flow goes to Step ST65.

At Step ST65, the Δx calculating unit 112 calculates an amount of positional offset (the first amount of positional offset) $\Delta x=x_{20}-x_{20}$' between the position $x_{20}$ of the centroid $G_{20}$ and position $x_{20}$' of the point $G_{20}$'. After calculating Δx, the flow goes to Step ST66.

At Step ST66, the second deciding unit 113 (see FIG. 2) decides whether or not a remaining region of the arm has been removed based on the value of Δx. When Δx>0, this means that the point $G_{20}$' lies on the side of the right arm with respect to the centroid $G_{20}$. Therefore, it may be considered that the right-arm region HR is still left when Δx>0. On the other hand, when Δx≤0, this means that the point $G_{20}$' overlies the centroid $G_{20}$ or the point $G_{20}$' lies on the side of the left arm with respect to the centroid $G_{20}$. Therefore, it may be considered that the remaining right-arm region HR has been removed when Δx≤0. Accordingly, in the present embodiment, it is decided that the right-arm region HR has been removed when Δx>0, while it is decided that the right-arm region HR is still left when Δx≤0. When Δx>0, the flow goes to Step ST67, and when Δx≤0, the flow goes to Step ST74. Here, Δx>0. Therefore, the flow goes to Step ST67.

At Step ST67, i is set to an initial value i=1. Symbol i designates a parameter for determining a position $x_d$ on the x-axis where removal of an extracted region is performed, which will be discussed later. After setting i=1, the flow goes to Step ST68.

Figure 17:
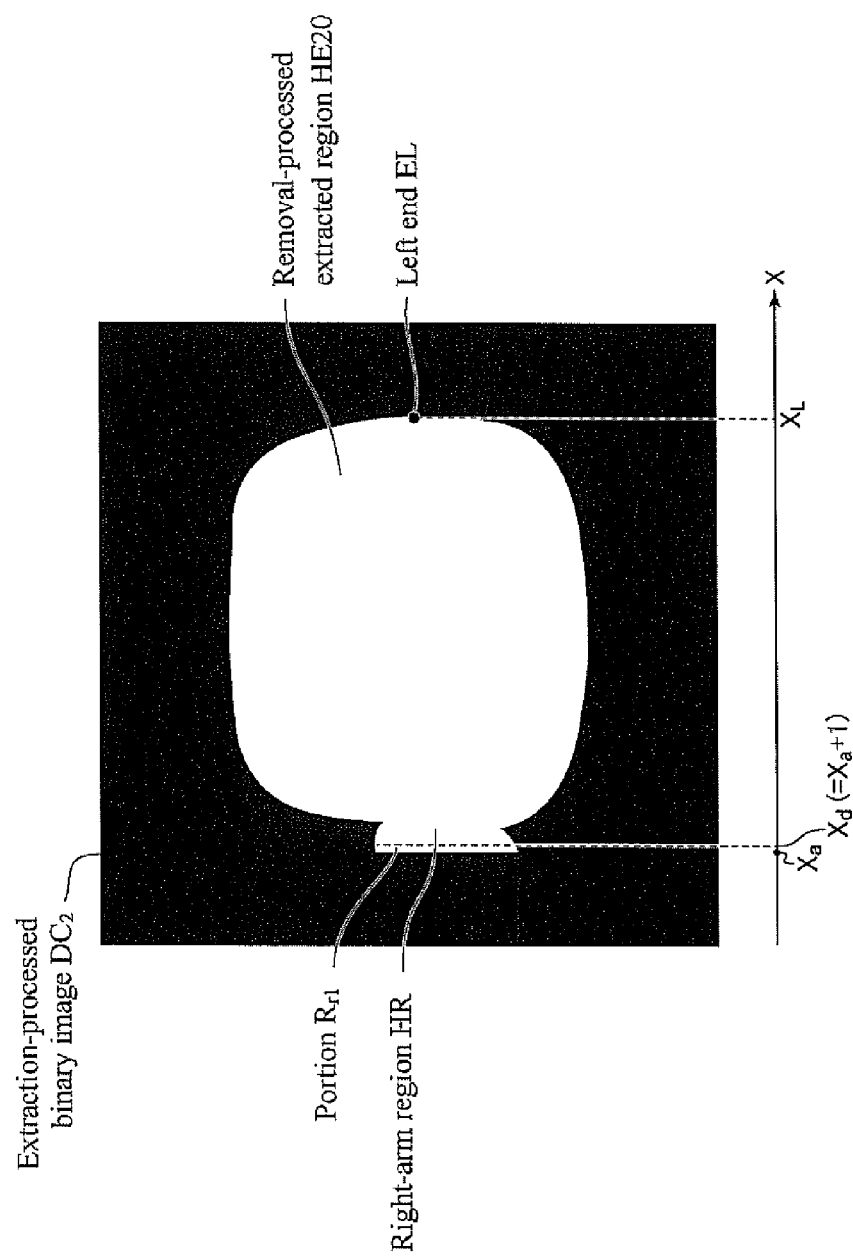
FIG. 17 is a diagram explaining Step ST68.

FIG. 17 is a diagram explaining Step ST68. At Step ST68, the removing unit 111 executes removal processing (the second removal processing) for removing a region at the position $x_d$ in the x-axis direction of the extracted region HE20. The value $x_d$ is represented by the following equation:

$$x_d = x_a + i.\qquad\text{Equation (1)}$$

Figure 18:
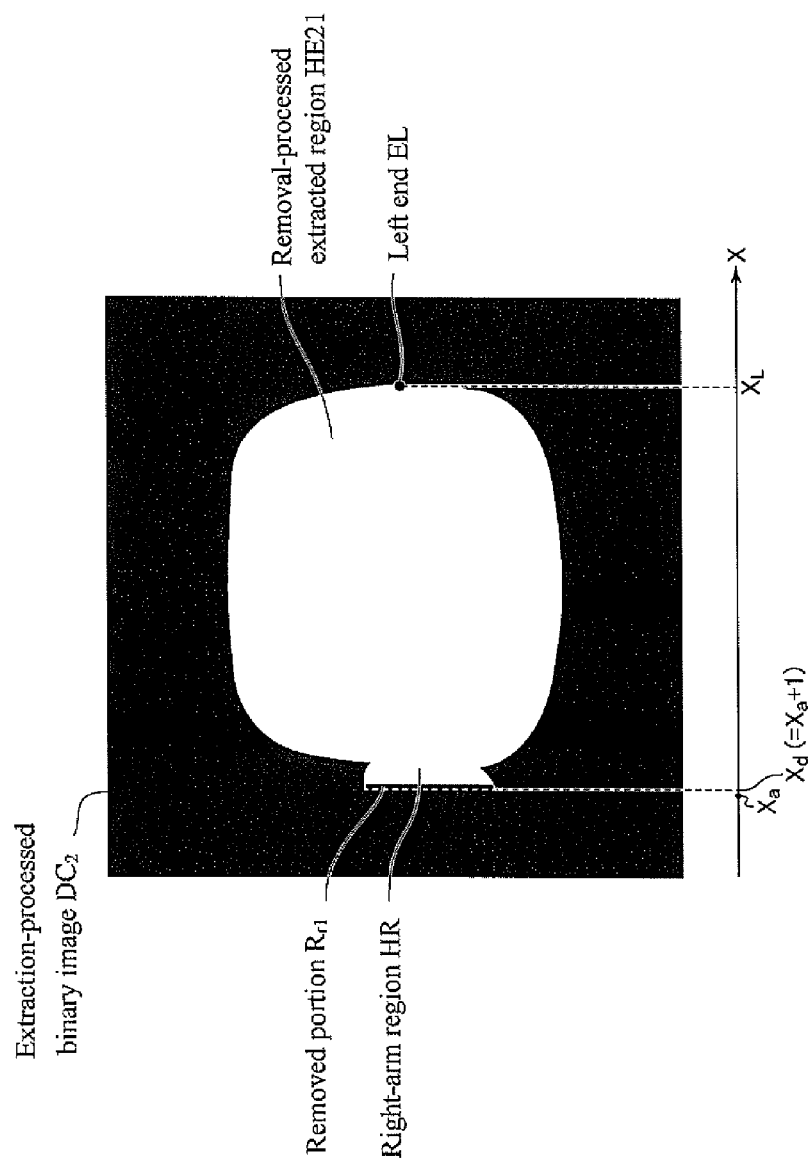
FIG. 18 is a diagram showing the extracted region after a portion $R_{r1}$ has been removed.

The right-hand side $x_a+i$ of Equation (1) represents a position that is shifted relative to the position $x_a$ by i pixels in the x-axis direction. Since i=1 is set here, $x_d=x_a+1$. Therefore, $x_d=x_a+1$ represents a position that is shifted relative to the position $x_a$ by one pixel in the x-axis direction. The removing unit 111 removes a portion $R_{r1}$ in the extracted region HE20 at $x_d$ (=$x_a+1$). Specifically, the removing unit 111 modifies a pixel value of a pixel at a position $x_d=x_a+1$ in the extracted region HE20 from a logical value of one to a logical value of zero. Thus, the portion $R_{r1}$ at the position $x_d=x_a+1$ in the extracted region HE2 is removed. Therefore, the portion $R_{r1}$ of the remaining right-arm region HR at the $x_d=x_a+1$ may be removed. FIG. 18 shows the extracted region after the portion $R_{r1}$ has been removed. In FIG. 18, the extracted region after the portion $R_{r1}$ has been removed is designated by symbol "HE21." After removing the portion $R_{r1}$ at the position $x_d=x_1+1$, the flow goes to Step ST69.

Figure 19:
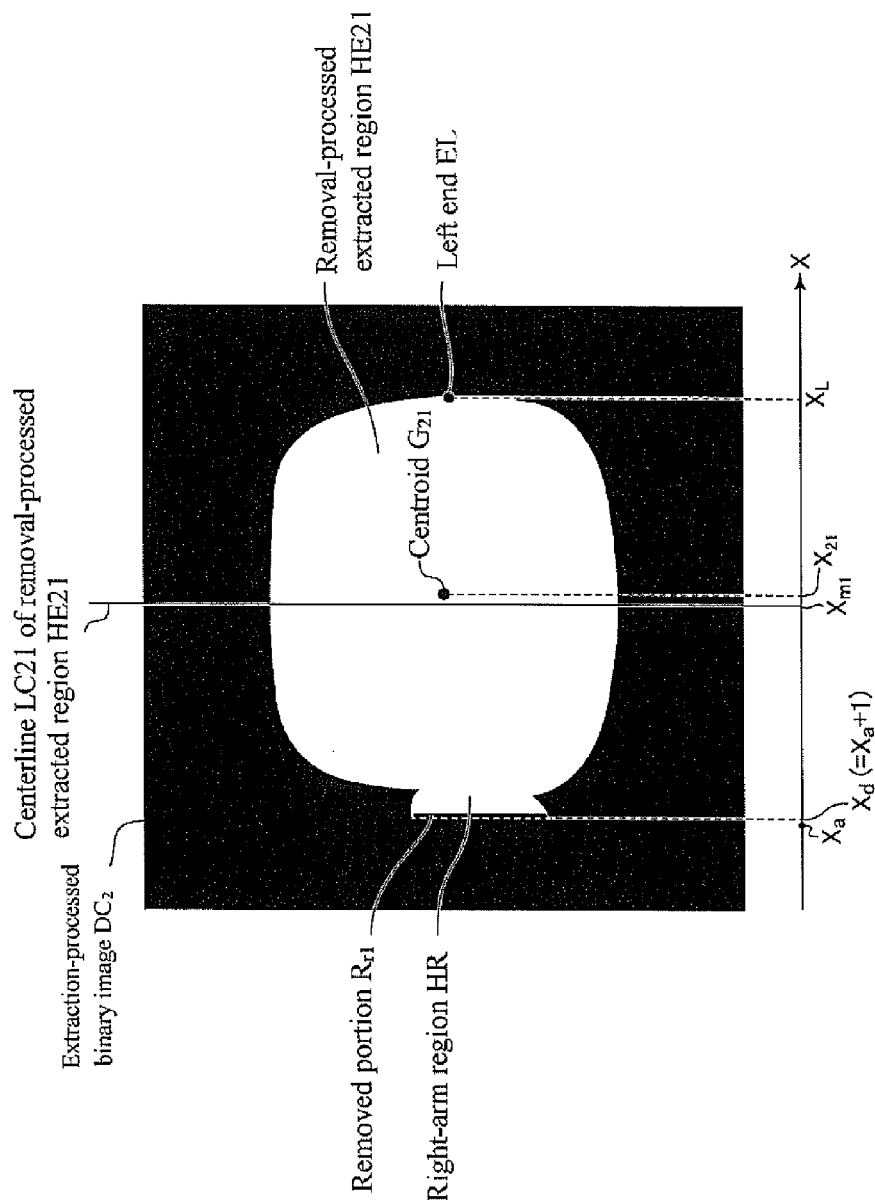
FIG. 19 is a diagram showing a centerline LC21 and a centroid $G_{21}$.

At Step ST69, the centerline calculating unit 105 calculates a centerline (the third centerline) of the extracted region HE21 obtained by the removal processing at Step ST68, and the centroid calculating unit 106 calculates a centroid (the third centroid) of the extracted region HE21. FIG. 19 shows thus-located centerline LC21 and centroid $G_{21}$. The position of the centroid $G_{21}$ in the x-axis direction is designated by $x=x_{21}$. After determining the centerline LC21 and centroid $G_{21}$, the flow goes to Step ST70.

Figure 20:
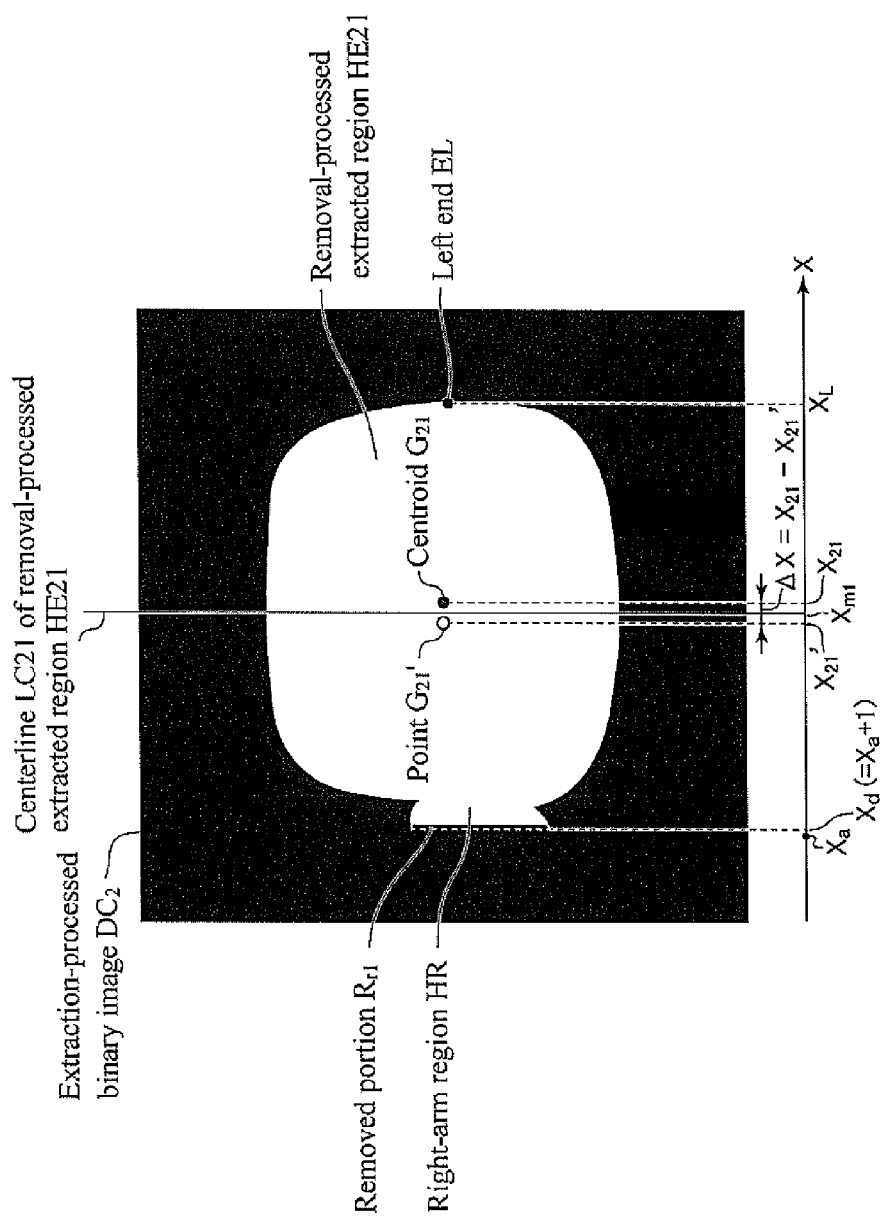
FIG. 20 is a diagram showing an identified point $G_{21}'$.

At Step ST70, the identifying unit 107 identifies a point $G_{21}'$ (the third point) that is in an axisymmetric positional relationship with the centroid $G_{21}$ with respect to the centerline LC21. FIG. 20 shows a thus-identified point $G_{21}'$. After identifying the point $G_{21}'$, the flow goes to Step ST71.

At Step ST71, the $\Delta x$ calculating unit 112 calculates an amount of positional offset (the second amount of positional offset) $\Delta x = x_{21} - x_{21}'$ between the position $x_{21}$ of the centroid $G_{21}$ and a position $x_{21}'$ of the point $G_{21}'$. After calculating $\Delta x$, the flow goes to Step ST72.

At Step ST72, the second deciding unit 113 decides whether or not the remaining region of the arm has been removed based on the value of $\Delta x$. When $\Delta x > 0$, this means that the point $G_{21}'$ lies on the side of the right arm with respect to the centroid $G_{21}$. Therefore, it may be considered that the right-arm region HR is still left when $\Delta x > 0$. On the other hand, when $\Delta x \le 0$, this means that the point $G_{21}'$ overlies the centroid $G_{21}$ or the point $G_{21}'$ lies on the side of the left arm with respect to the centroid $G_{21}$. Therefore, it may be considered that the remaining right-arm region HR has been removed when $\Delta x \le 0$. Accordingly, in the present embodiment, it is decided that the right-arm region HR has been removed when $\Delta x > 0$, while it is decided that the right-arm region HR is still left when $\Delta x \le 0$. When $\Delta x > 0$, the flow goes to Step ST73, and when $\Delta x \le 0$, the flow goes to Step ST74. Here, $\Delta x > 0$. Therefore, the flow goes to Step ST73.

At Step ST73, i is incremented. Here, i is increment from i=1 to i=2. After incrementing i, the flow goes back to Step ST68.

Figure 21:
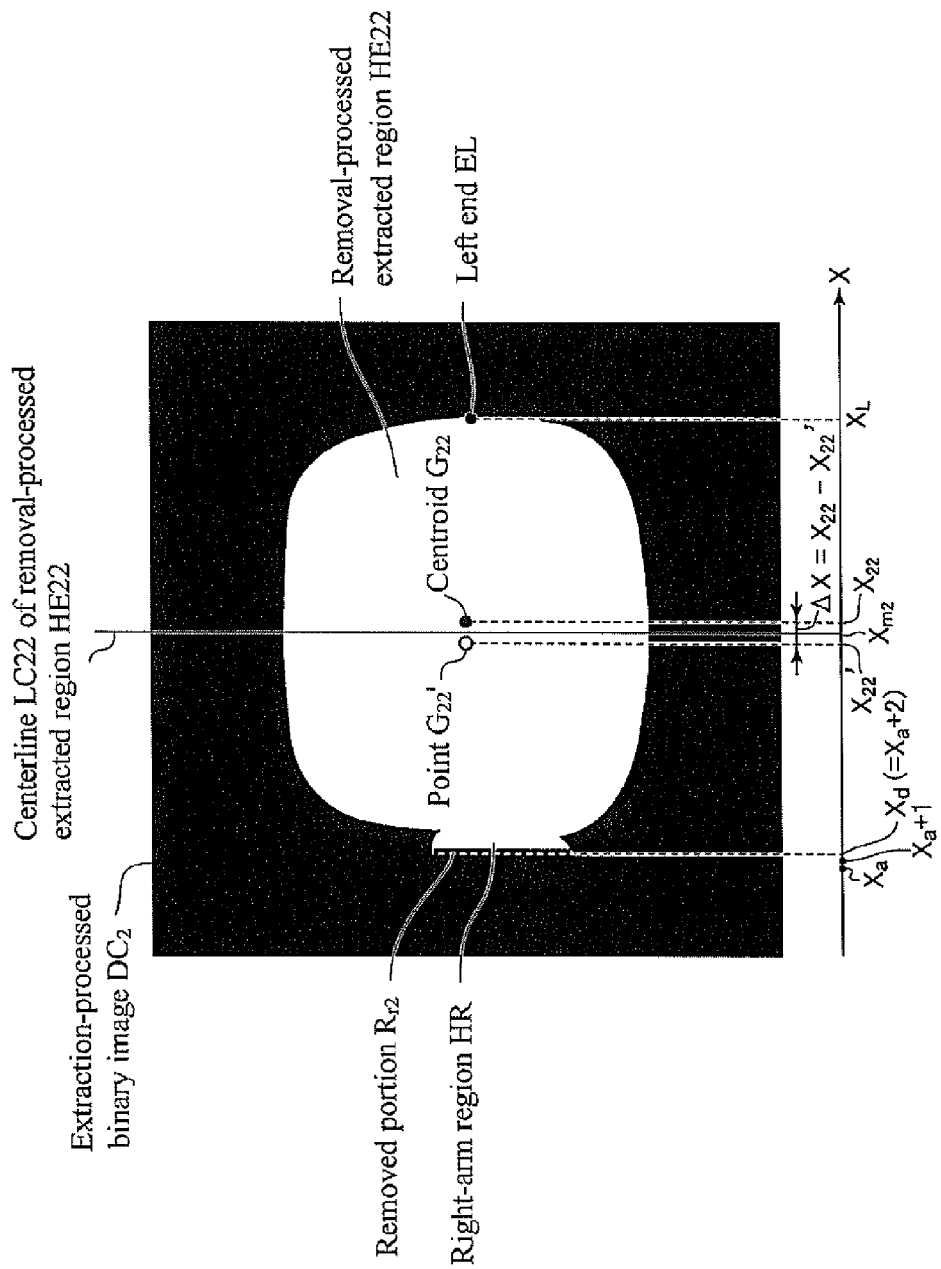
FIG. 21 is a diagram explaining Steps ST68 to ST73 in the case that i is incremented to i=2.

FIG. 21 is a diagram explaining Steps ST68 to ST73 when i is incremented to i=2. The removing unit 111 removes a portion $R_{r2}$ at $x_d=x_a+2$ (Step ST68). Next, the centerline calculating unit 105 calculates a centerline LC22 of a removal-processed extracted region HE22, and the centroid calculating unit 106 calculates a centroid $G_{22}$ of the extracted region HE22 (Step ST69). Next, the identifying unit 107 identifies a point $G_{22}'$ that is in an axisymmetric positional relationship with the centroid $G_{22}$ with respect to the centerline LC22 (Step ST70). Next, the $\Delta x$ calculating unit 112 calculates an amount of positional offset $\Delta x = x_{22} - x_{22}'$ between a position $x_{22}$ of the centroid $G_{22}$ and a position $x_{22}'$ of the point $G_{22}'$ (Step ST71). The second deciding unit 113 then decides whether or not $\Delta x \le 0$ (Step ST72). Here, $\Delta x > 0$. Therefore, the flow goes to Step ST73, where i is incremented from i=2 to i=3, and then goes back to Step ST68.

Thus, each time i is incremented, the flow goes back to Step ST68 and Steps ST68 to ST72 are executed. Then, while it is decided that $\Delta x > 0$ at Step ST72, a loop from Step ST68 to Step ST73 is repetitively executed.

Figure 22:
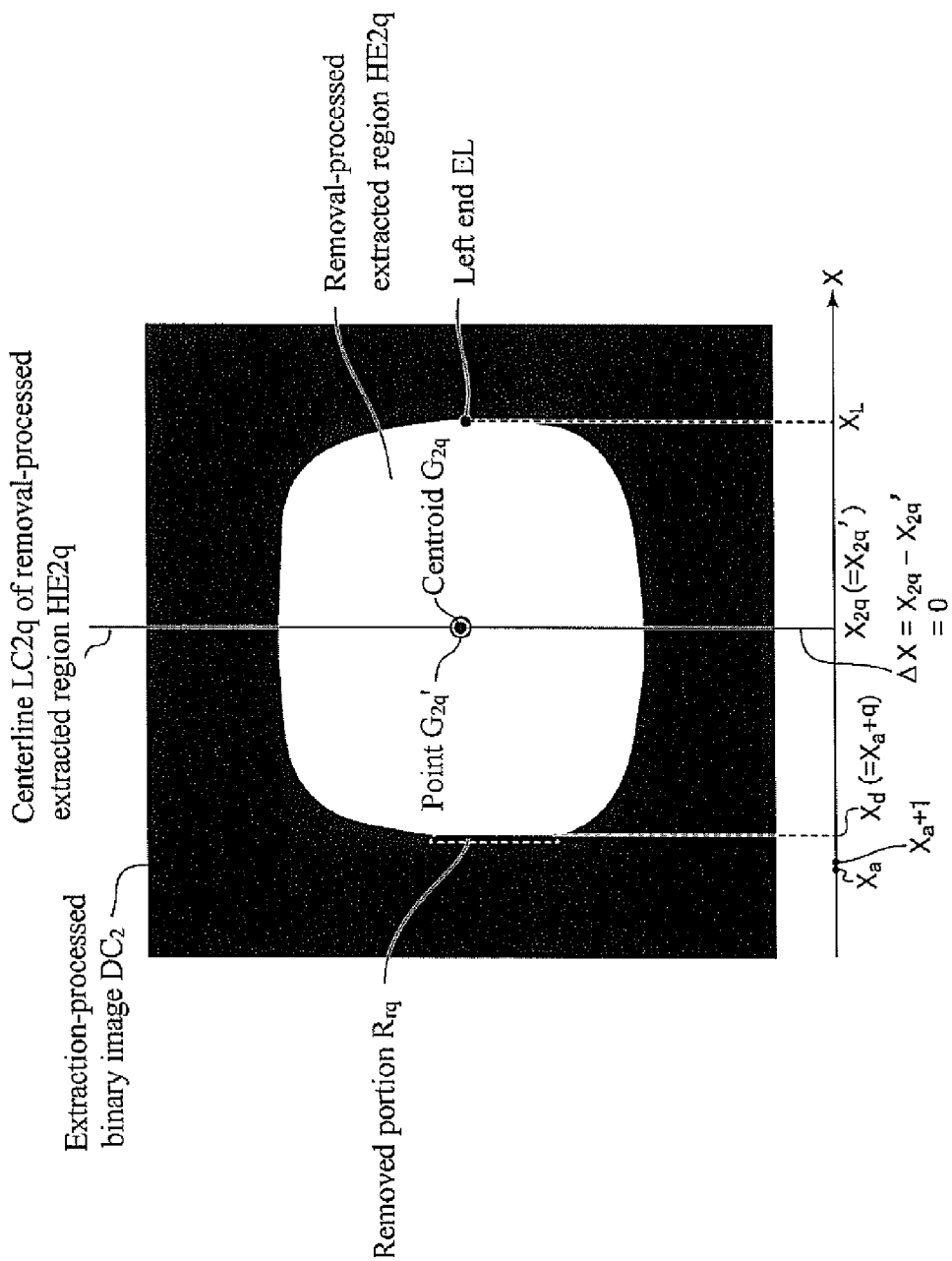
FIG. 22 is a diagram explaining Steps ST68 to ST72 in the case that i is incremented to i=q.

FIG. 22 is a diagram explaining Steps ST68 to ST72 when i is incremented to i=q. The removing unit 111 removes a portion $R_{rq}$ at $x_d=x_a+q$ (Step ST68). Next, the centerline calculating unit 105 calculates a centerline LC2$q$ of a removal-processed extracted region HE2$q$, and the centroid calculating unit 106 calculates a centroid $G_{2q}$ of the extracted region HE2$q$ (Step ST69). Next, the identifying unit 107 identifies a point $G_{2q}'$ that is in an axisymmetric positional relationship with the centroid $G_{2q}$ with respect to the centerline LC2$q$ (Step ST70). Next, the $\Delta x$ calculating unit 112 calculates an amount of positional offset $\Delta x = x_{2q} - x_{2q}'$ between a position $x_{2q}$ of the centroid $G_{2q}$ and a position $x_{2q}'$ of the point $G_2'$ (Step ST71). The second deciding unit 113 then decides whether or not $\Delta x \le 0$ (Step ST72). Here, the point $G_{2q}'$ overlies the centroid $G_{2q}$. Therefore, $\Delta x = 0$, so that it is decided that the right-arm region HR has been successfully removed, and the flow goes to Step ST74.

At Step ST74, the determining unit 110 determines the centerline LC2$q$ calculated when i=q as a centerline representing the central position in the RL direction of the body of the subject.

Figure 23:
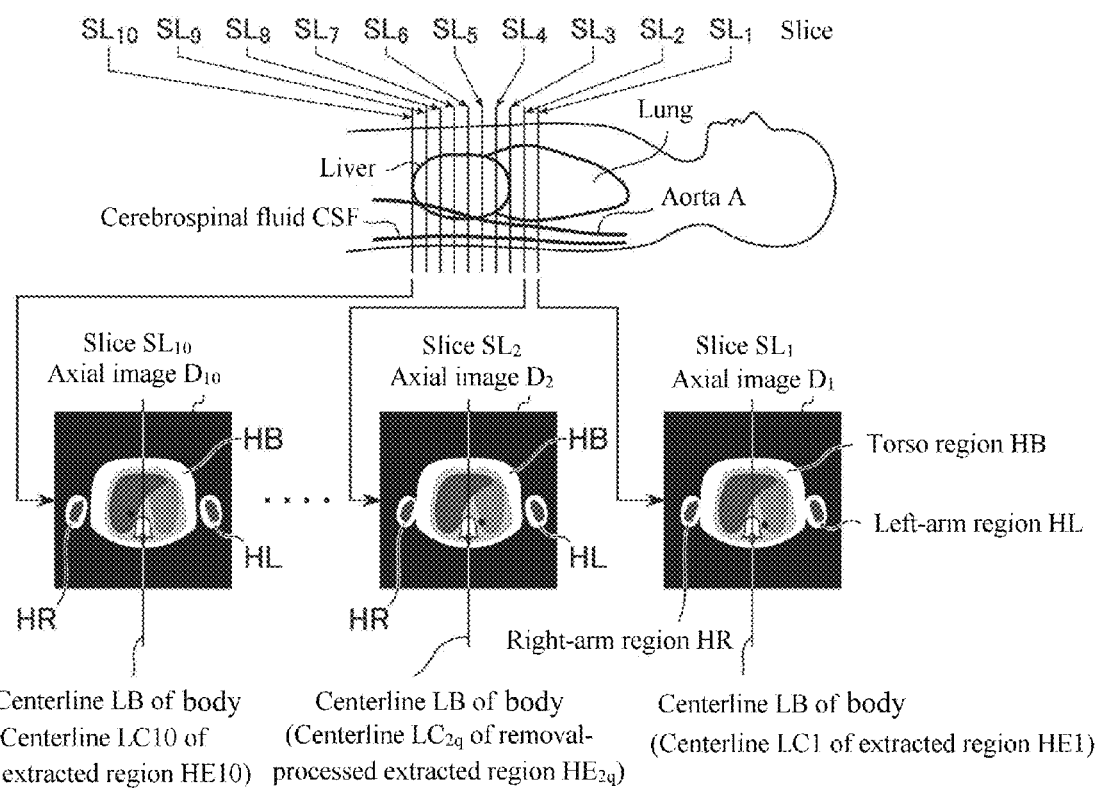
FIG. 23 is a diagram schematically showing a centerline LB of a body located on an axial image-by-axial image basis.

Similarly thereafter, a centerline is located according to the flow at Step ST5 for axial images in other slices as well. FIG. 23 schematically shows a centerline LB of the body located for each axial image. After locating the centerline LB of the body, the flow goes to Step ST6 (see FIG. 5).

At Step ST6, based on the centerline determined at Step ST5, a cerebrospinal fluid CSF is detected. For a method of detecting the cerebrospinal fluid CSF, one described in "Med. Imag. Tech., Vol. 31, No. 2 March 2013" may be employed, for example. Once the cerebrospinal fluid has been detected, the flow goes to Step ST7, where an aorta is detected with reference to the position of the cerebrospinal fluid. For a method of detecting the aorta, one described in "Med. Imag. Tech., Vol. 31, No. 2 March 2013" may also be employed.

Therefore, by executing Steps ST1 to ST7, the aorta A in all the slices $SL_1$ to $SL_{10}$ may be detected. After detecting the aorta A in all the slices $SL_1$ to $SL_{10}$, the flow goes to Step ST8.

Figure 24:
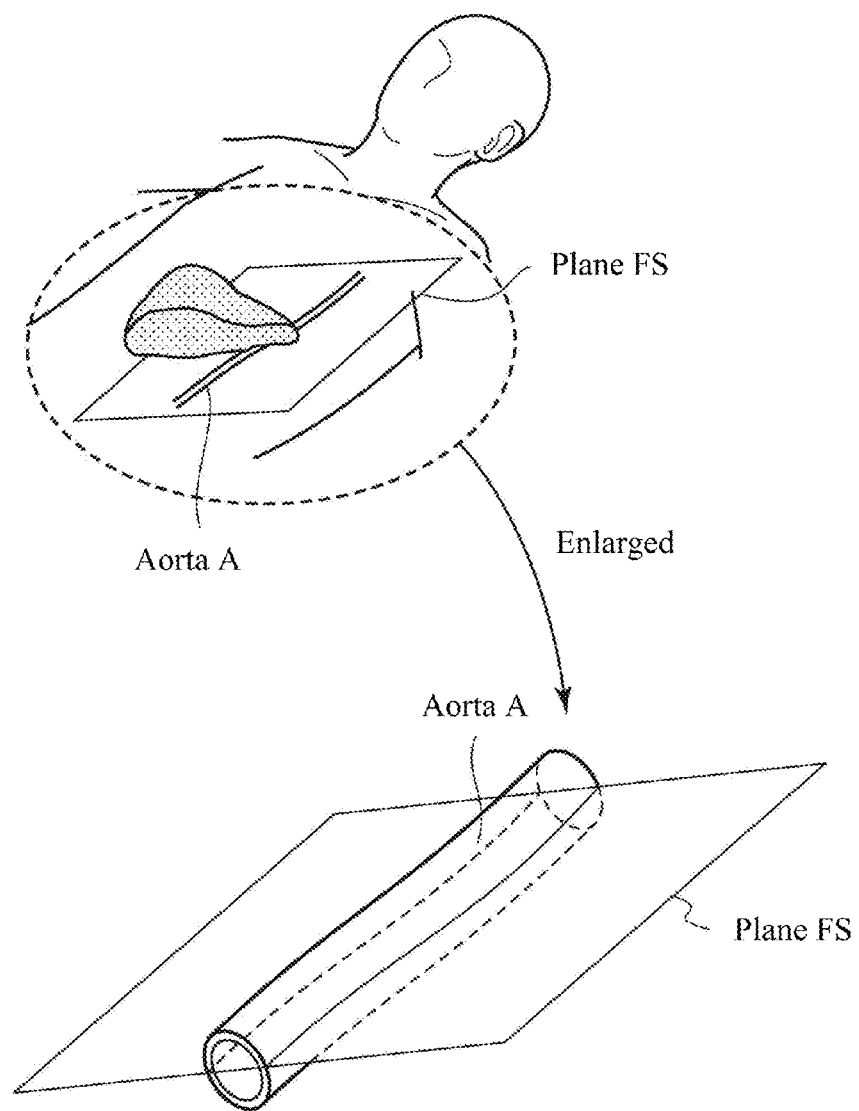
FIG. 24 is a diagram schematically showing a plane FS.

At Step ST8, based on the position of the aorta A detected from the slices $SL_1$ to $SL_{10}$, a plane longitudinally cutting the aorta is found. FIG. 24 schematically shows a calculated plane FS. Now an exemplary method of obtaining the plane FS will be briefly described.

First, based on the position of the aorta A detected from the slices $SL_1$ to $SL_{10}$, a region of the cross section of the aorta is identified on an axial image-by-axial image basis. For example, a segmentation technique such as a Level Set may be used as a method of identifying a region of the cross section of the aorta. After identifying the region of the cross section of the aorta, a center of the cross section of the aorta is located. Since the cross section of the aorta A may be considered to have a generally circular shape, a position of the center of the aorta A may be located on an axial image-by-axial image basis by regarding the identified region as a circle. After locating the position of the center of the aorta A, a plane FS longitudinally cutting the aorta may be obtained based on the position of the center of the aorta located on an axial image-by-axial image basis. The plane FS longitudinally cuts the aorta generally in parallel with a direction of the course of the aorta. After obtaining the plane FS, the flow goes to Step ST9.

At Step ST9, a tracker region for detecting the contrast medium is defined. Now a method of defining a tracker region will be described below.

Figure 25:
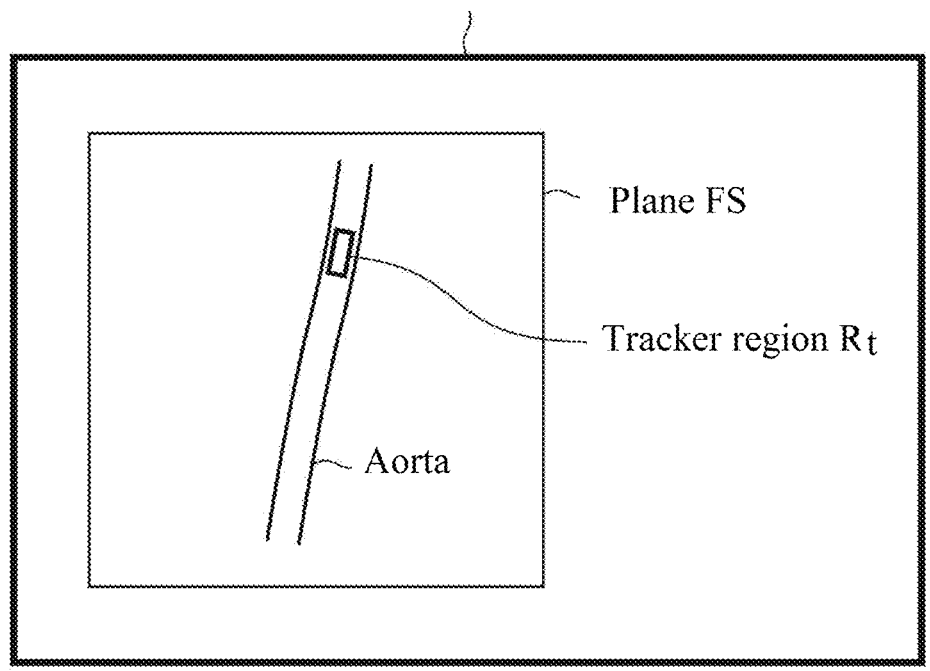
FIG. 25 is a diagram explaining an exemplary method of defining a tracker region.

FIG. 25 is a diagram explaining an exemplary method of defining a tracker region. The operator operates the operating section 12 (see FIG. 1) to input a command for displaying the plane FS obtained at Step ST8 in the display section 13. Once the command has been input, the plane FS obtained at Step ST8 is displayed in the display section 13.

After the plane FS is displayed, the operator refers to a positional relationship among organs and the aorta displayed in the plane FS to define a tracker region. FIG. 25 shows a case in which a tracker region $R_t$ is defined to lie in the inside of the aorta A. It should be noted that the tracker region $R_t$ may be automatically defined based on the position of the aorta A. After defining the tracker region $R_t$, the flow goes to Step ST10.

At Step ST10, a main scan MS (see FIG. 3) is performed. In the main scan MS, the subject is injected with the contrast medium, and a sequence for detecting the contrast medium from the tracker region $R_t$ is repetitively performed. Once a predefined amount of the contrast medium has been injected into the tracker region $R_t$, a scan for obtaining an image of the liver is performed, and the flow is terminated.

In the present embodiment, extraction processing for extracting the torso region HB from the separation-processed binary images $DB_1$ to $DB_{10}$ is executed. Then, a centerline and a centroid of the extracted region are located for each of the extraction-processed binary images $DC_1$ to $DC_{10}$. Next, a point at a position axisymmetric with the centroid with respect to the centerline is located and a distance between the centroid and point is obtained. When the distance d is equal to or greater than a threshold dth (d≥dth), it is decided that the region of one of the arms is still left in the extracted region without being removed, and removal of the remaining region of the arm is performed. Therefore, when the region of one of the arms is extracted in addition to the torso region HB, the region of the one of the arms may be removed, so that the centerline of the body may be thus located. Since the CSF lies on the centerline (or near the centerline), the method of FIG. 3 in the paper may be employed to thereby detect the CSF. Since the aorta may be thus detected on a slice-by-slice basis with reference to the position of the CSF, a tracker region may be defined.

In the present embodiment, a localizer scan is a 2D scan for obtaining an axial image for each slice. The localizer scan, however, is not limited to the 2D scan, and may be a 3D scan for obtaining a 3D image of a part to be imaged. From the 3D image of the part to be imaged obtained by the 3D scan, an axial image at each slice position may be produced, and the processing of locating a centerline may be executed based on these axial images.

While the present embodiment detects the cerebrospinal fluid CSF based on the centerline of the body, the present invention may be applied to a case in which a tissue other than the cerebrospinal fluid CSF is to be detected.

While the present embodiment locates a centerline of the body based on an axial image, the centerline of the body may be located based on an image in a plane other than the axial plane (for example, an oblique plane intersecting the axial plane at an angle).

The present embodiment addresses a case in which a subject is imaged using a contrast medium. The present invention, however, may be applied to a case in which non-contrast enhanced imaging using no contrast enhancement is performed, insofar as there is a need for locating a centerline of the body.

While the present embodiment is described with reference to images obtained by an MR apparatus, the present invention may be applied to images obtained by a medical apparatus different from the MR apparatus (a CT apparatus, for example).

I claim:

1. A centerline determining apparatus for determining a centerline of a body of a subject based on imaging data obtained from a part to be imaged including a torso part, a left-arm part, and a right-arm part of said subject, said apparatus comprising:
   an image producing unit for producing an image including a first region representing a cross section of said torso part, a second region representing a cross section of said left-arm part, and a third region representing a cross section of said right-arm part based on said imaging data;
   a binarizing unit for executing binarization processing for binarizing said image to obtain a binary image in which said first region, said second region, and said third region are represented by a first logic and a region outside of said part to be imaged is represented by a second logic;
   a separating unit for executing separation processing for separating said second region and said third region included in said binary image from said first region included in said binary image;
   an extracting unit for executing extraction processing for extracting said first region from an image obtained by said separating unit; and
   a unit for locating a centerline of the body of said subject by executing, in a case that said first region and one of said second region and said third region are included in an extracted region extracted by said extraction processing and the other of said second region and said third region is not included therein, first removal processing for removing said one region from said extracted region, and locating a centerline of the body of said subject based on said first-removal-processed extracted region.

2. The centerline determining apparatus as recited in claim 1, wherein said unit for locating a centerline of the body comprises first deciding unit for deciding whether said extracted region is a first extracted region that includes none or both of said second region and said third region, or else, said extracted region is a second extracted region that includes said one region and does not include said other region.

3. The centerline determining apparatus as recited in claim 2, wherein said unit for locating a centerline of the body comprises centerline calculating unit for calculating a first centerline representing a central position in a specified direction of said extracted region.

4. The centerline determining apparatus as recited in claim 3, wherein said unit for locating a centerline of the body comprises centroid calculating unit for calculating a first centroid of said extracted region.

5. The centerline determining apparatus as recited in claim 4, wherein said unit for locating a centerline of the body comprises identifying unit for identifying a first point that is in an axisymmetric positional relationship with said first centroid with respect to said first centerline of said extracted region.

6. The centerline determining apparatus as recited in claim 5, wherein said unit for locating a centerline of the body comprises distance calculating unit for calculating a distance in said specified direction between said first centroid and said first point.

7. The centerline determining apparatus as recited in claim 6, wherein said first deciding unit decides whether said extracted region is said first extracted region or said second extracted region based on said distance.

8. The centerline determining apparatus as recited in claim 5, wherein said unit for locating a centerline of the body comprises removing unit for executing said first removal processing in a case that said extracted region is decided to be said second extracted region.

9. The centerline determining apparatus as recited in claim 8, wherein said unit for locating a centerline of the body;
  locates a second centerline representing a central position in said specified direction of said first-removal-processed extracted region;
  locates a second centroid of said first-removal-processed extracted region;
  locates a second point that is in an axisymmetric positional relationship with said second centroid with respect to said second centerline;

obtains a first amount of positional offset between a position in said specified direction of said second centroid and a position in said specified direction of said second point; and decides whether or not said one region is still left based on said first amount of positional offset.

10. A medical apparatus comprising:

a scanning section for performing a scan for obtaining imaging data of a part to be imaged including a torso part, a left-arm part, and a right-arm part of a subject;

an image producing unit for producing an image including a first region representing a cross section of said torso part, a second region representing a cross section of said left-arm part, and a third region representing a cross section of said right-arm part based on said imaging data;

a binarizing unit for executing binarization processing for binarizing said image to obtain a binary image in which said first region, said second region, and said third region are represented by a first logic and a region outside of said part to be imaged is represented by a second logic;

a separating unit for executing separation processing for separating said second region and said third region included in said binary image from said first region included in said binary image;

an extracting unit for executing extraction processing for extracting said first region from an image obtained by said separating unit; and a unit for locating a centerline of the body of said subject by executing, in a case that said first region and one of said second region and said third region are included in an extracted region extracted by said extraction processing and the other of said second region and said third region is not included therein, first removal processing for removing said one region from said extracted region, and locating a centerline of the body of said subject based on said first-removal-processed extracted region.

* * * * *